(12) United States Patent
Flanigan et al.

(10) Patent No.: US 8,323,773 B2
(45) Date of Patent: Dec. 4, 2012

(54) LAMINATES WITH STRUCTURED LAYERS

(75) Inventors: Peggy-Jean P. Flanigan, Woodbury, MN (US); Mieczyslaw Mazurek, Roseville, MN (US); Peter A. Stark, Cottage Grove, MN (US); Patrick R. Fleming, Lake Elmo, MN (US); Janice R. Manore, Roberts, WI (US); Eric J. Borchers, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 670 days.

(21) Appl. No.: 09/974,710

(22) Filed: Oct. 9, 2001

(65) Prior Publication Data

US 2003/0077423 A1    Apr. 24, 2003

(51) Int. Cl.
  *B32B 3/00* (2006.01)
  *B32B 7/12* (2006.01)
  *B32B 15/04* (2006.01)
  *B32B 9/00* (2006.01)
  *B32B 33/00* (2006.01)

(52) U.S. Cl. ....... 428/166; 428/156; 428/40.1; 428/354; 428/343

(58) Field of Classification Search ............... 428/40.1, 428/156, 166, 172, 343, 354
See application file for complete search history.

(56) References Cited

U.S. PATENT DOCUMENTS

| | | | |
|---|---|---|---|
| 2,264,628 A | 12/1941 | Engert et al. | |
| 2,638,430 A * | 5/1953 | Mann | 156/270 |
| 2,667,436 A | 1/1954 | Goepfert et al. | 154/53.5 |
| RE24,906 E | 12/1960 | Ulrich | 206/59 |
| 3,179,552 A * | 4/1965 | Hauser et al. | 428/74 |
| 3,239,478 A | 3/1966 | Harlan, Jr. | 260/27 |
| 3,301,741 A * | 1/1967 | Henrickson et al. | 428/41.5 |
| 3,457,919 A * | 7/1969 | Harbard | 602/55 |
| 3,935,338 A | 1/1976 | Robertson | 427/207 |
| 4,025,159 A | 5/1977 | McGrath | 350/105 |
| 4,181,752 A | 1/1980 | Martens et al. | 427/54.1 |
| 4,273,827 A * | 6/1981 | Sweeney et al. | 428/316.6 |
| 4,397,905 A | 8/1983 | Dettmer et al. | 428/180 |
| 4,460,634 A | 7/1984 | Hasegawa | 428/124 |
| 4,554,324 A | 11/1985 | Husman et al. | 525/301 |
| 4,576,850 A | 3/1986 | Martens | 428/156 |
| 4,587,152 A | 5/1986 | Gleichenhagen et al. | 428/195 |
| 4,599,265 A | 7/1986 | Esmay | 428/355 |
| 4,801,458 A * | 1/1989 | Hidaka et al. | 424/443 |
| 4,889,234 A | 12/1989 | Sorensen et al. | 206/459 |
| 4,913,926 A | 4/1990 | Rutkowski | 427/14.1 |

(Continued)

FOREIGN PATENT DOCUMENTS

DE    34 17 746 A1    11/1985

(Continued)

OTHER PUBLICATIONS

Satas (ed.), *Handbook of Pressure Sensitive Adhesive Technology*, Second Edition, 1989, Van Nostrand Reinhold, New York (Table of Contents only).

*Primary Examiner* — Catherine A Simone

(74) *Attorney, Agent, or Firm* — Jeffrey M. Olofson

(57) ABSTRACT

An article including at least one first layer with a first major surface and a second major surface, wherein at least one of the first and second major surfaces is a structured surface; and a cap layer in contact with a structured surface of the first layer.

23 Claims, 14 Drawing Sheets

U.S. PATENT DOCUMENTS

| | | | |
|---|---|---|---|
| 4,952,650 A | 8/1990 | Young et al. | 526/194 |
| 5,087,494 A * | 2/1992 | Calhoun et al. | 428/40.1 |
| 5,141,790 A | 8/1992 | Calhoun et al. | 428/40 |
| 5,158,557 A * | 10/1992 | Noreen et al. | 604/389 |
| 5,169,727 A | 12/1992 | Boardman | 428/447 |
| 5,212,011 A * | 5/1993 | Ishikawa et al. | 428/343 |
| 5,268,228 A | 12/1993 | Orr | 428/343 |
| 5,296,277 A | 3/1994 | Wilson et al. | 428/40 |
| 5,298,791 A | 3/1994 | Liberty et al. | 257/707 |
| 5,344,681 A * | 9/1994 | Calhoun et al. | 428/42.3 |
| 5,362,516 A | 11/1994 | Wilson et al. | 427/207.1 |
| 5,405,675 A | 4/1995 | Sawka et al. | 428/195 |
| 5,437,754 A | 8/1995 | Calhoun | 15/231 |
| 5,449,540 A | 9/1995 | Calhoun et al. | 428/42 |
| 5,462,765 A | 10/1995 | Calhoun et al. | 427/198 |
| 5,585,178 A | 12/1996 | Calhoun et al. | 428/343 |
| 5,597,618 A | 1/1997 | Bayer, Jr. et al. | 427/207.1 |
| 5,637,646 A | 6/1997 | Ellis | 525/309 |
| 5,650,215 A | 7/1997 | Mazurek et al. | 428/156 |
| 5,753,768 A | 5/1998 | Ellis | 525/309 |
| 5,795,636 A | 8/1998 | Keller et al. | 428/40.1 |
| 5,861,348 A | 1/1999 | Kase | 442/184 |
| 5,888,650 A * | 3/1999 | Calhoun et al. | 428/354 |
| 5,889,118 A | 3/1999 | Delgado et al. | 525/228 |
| 5,897,930 A | 4/1999 | Calhoun et al. | 428/41.8 |
| 5,906,883 A * | 5/1999 | Blanc-Brude | 428/178 |
| 5,986,011 A | 11/1999 | Ellis | 525/309 |
| 6,103,152 A | 8/2000 | Gehlsen et al. | 264/45.4 |
| 6,123,890 A | 9/2000 | Mazurek et al. | 264/293 |
| 6,171,985 B1 | 1/2001 | Joseph et al. | 442/346 |
| 6,197,397 B1 | 3/2001 | Sher et al. | 428/42.3 |

FOREIGN PATENT DOCUMENTS

| | | |
|---|---|---|
| EP | 0 459 059 A2 | 12/1991 |
| EP | 0 279 579 B1 | 4/1993 |
| GB | 1 511 060 | 5/1978 |
| JP | 59-53787 | 3/1984 |
| JP | 59-78285 | 5/1984 |
| JP | 60-96444 | 5/1985 |
| JP | 63-223081 | 8/1988 |
| JP | 3-67043 | 3/1991 |
| JP | 3-243677 | 10/1991 |
| JP | 03-115639 | 8/1992 |
| JP | 4-301336 | 10/1992 |
| JP | 2503717 | 3/1994 |
| JP | 06-184502 | 7/1994 |
| JP | 6-212131 | 8/1994 |
| JP | 06-248243 | 9/1994 |
| JP | 7-090231 | 4/1995 |
| JP | 7-138541 | 5/1995 |
| JP | 8-100155 | 4/1996 |
| JP | 08100155 A * | 4/1996 |
| JP | 09-141812 | 6/1997 |
| JP | 2587198 | 12/1998 |
| JP | 11181367 A * | 7/1999 |
| JP | 11-323790 | 11/1999 |
| JP | 2-994411 | 12/1999 |
| WO | WO 85/04602 | 10/1985 |
| WO | WO 91/00945 | 1/1991 |
| WO | WO 94/00525 | 1/1994 |
| WO | WO 95/11945 | 5/1995 |
| WO | WO 97/18276 | 5/1997 |
| WO | WO97/33946 | 9/1997 |
| WO | WO 97/33946 | 9/1997 |
| WO | WO 98/29516 | 7/1998 |
| WO | WO 99/35201 | 7/1999 |
| WO | WO99/58620 | 11/1999 |
| WO | WO 00/44843 | 8/2000 |
| WO | WO00/69985 | 11/2000 |
| WO | WO 00/69985 | 11/2000 |

* cited by examiner

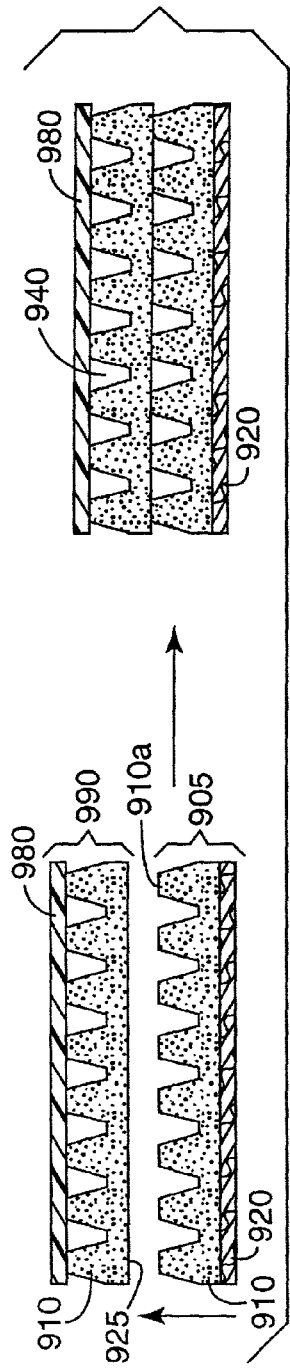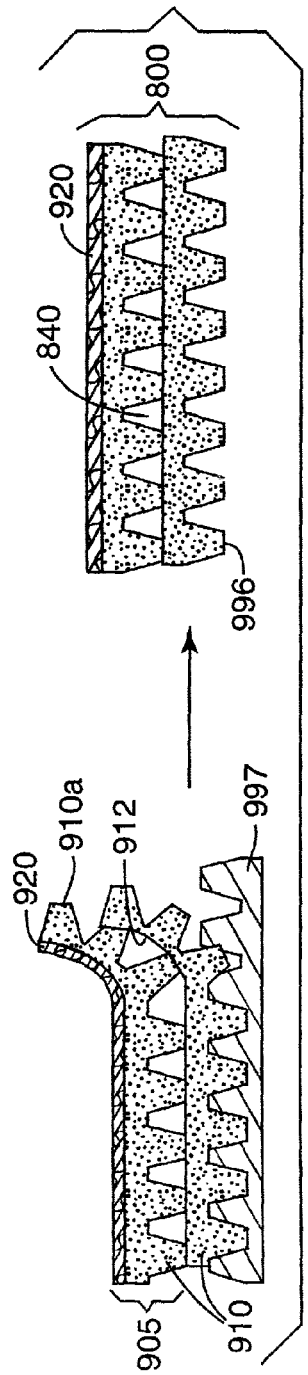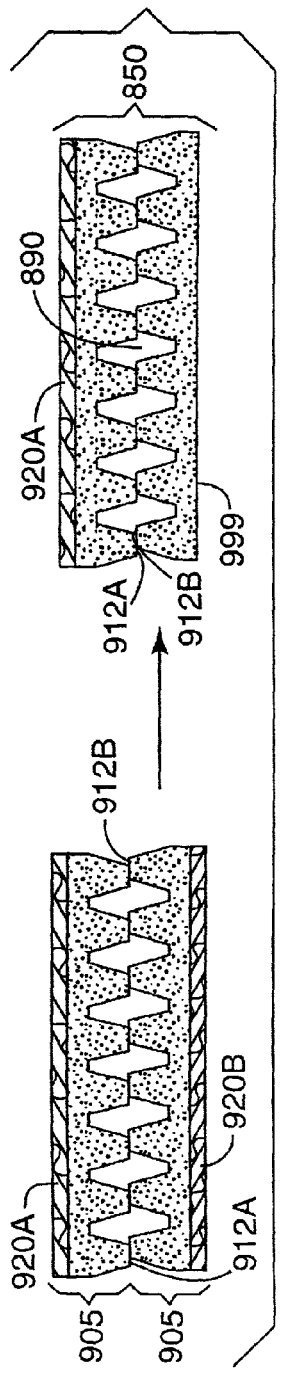

LAMINATES WITH STRUCTURED LAYERS

TECHNICAL FIELD

The present invention relates to laminate articles including one or more structured layers and methods for making them.

BACKGROUND

Foamed adhesives can be generated by the creation of gas-filled voids in an adhesive matrix (e.g., by means of a blowing agent) and are particularly desirable in applications requiring high peel strength. Foamed adhesives have a variety of additional advantageous properties, such as low consumption of adhesive, and high tack and bond strength. The elasticity and plasticity of the foamed adhesive compositions make articles including foamed adhesive layers highly conformable, even on uneven surfaces.

However, the placement and size of the gas-filled voids within the adhesive matrix is difficult to control. Due to the imprecise nature of the blowing process, it is not possible to precisely control the total void volume within the adhesive matrix. In addition, the ratio of adhesive matrix relative to the total void volume is relatively low, which renders this foam-based adhesives unsuitable in certain applications requiring very thin constructions.

SUMMARY

U.S. Pat. No. 6,197,397 B1 (Sher et al.), U.S. Pat. No. 5,897,930 (Calhoun et al.) and U.S. Pat. Nos. 5,650,215 and 6,123,890 (Mazurek et al.) describe articles having adhesive layers with a precisely replicated surface topography. The performance properties of the articles can be tailored by independently varying the rheological properties of the adhesive and the structures formed in the adhesive layer. For example, channels in the adhesive layer may be used to provide fluid egress when the article is adhered to a substrate, while pegs and posts may be used to control the level of adhesion to the substrate.

In one aspect, the invention resides in the finding that if an overlayer is placed in contact with a surface of a structured layer having a surface topography, certain regions of the structured layer become discrete or discontinuous channels or reservoirs that may be used to advantage to tailor the properties of the laminate construction. For example, if a cap layer is placed in contact with and overlies a structured surface of an adhesive layer, the regions between the structures in the adhesive matrix, or the structures themselves, form an array of partially or fully enclosed channels or reservoirs or channels. This array of channels and reservoirs or channels may be used, alone or in combination with non-structured adhesive layers or additional structured adhesive layers, to provide laminate articles with a wide range of unique properties.

For example, the reservoirs or channels or channels may be precisely shaped and distributed to provide a high ratio of void volume relative to adhesive matrix as compared to conventional foam-based adhesives. As a result of their lower density, the adhesive laminate constructions can be made thinner than standard foam-based adhesive constructions with comparable void volumes. These thin and highly conformable laminates can be tailored to exhibit a relatively higher or lower peel force relative to non-structured adhesive articles of the same thickness.

In addition, the reservoirs or channels in the adhesive layers can include controlled quantities of gaseous, liquid, and/or solid substances to further tailor the properties of the laminate article. The design (i.e., pitch, depth, contact area, wall and post width, and shape) of the structured adhesives can be tailored to achieve the desired size, density, and placement of reservoirs or channels within the adhesive without the use of a structured release liner.

In one aspect, the invention is an article including at least one first layer with a first major surface and a second major surface, wherein at least one of the first and second major surfaces is a structured surface; and a cap layer in contact with a structured surface of the first layer, wherein the cap layer includes an adhesive.

In a second aspect, the invention is an article including at least one adhesive layer with a first major surface and a second major surface, wherein at least one of the first and second major surfaces is a structured surface; and a cap layer in contact with a structured surface of an adhesive layer.

In a third aspect, the invention is a tape including: (a) at least one pressure sensitive adhesive layer with a first major surface and a second major surface, wherein the first major surface is a structured surface and the second major surface is a non-structured surface; and (b) a cap layer in contact with the first major surface.

In a fourth aspect, the invention is a laminate article including (a) a first adhesive layer having a first major surface and a second major surface, wherein at least one of the first and second major surfaces is a structured surface, and (b) a second adhesive layer having a first major surface and a second major surface, wherein at least one of the first and second major surfaces is a structured surface.

In a fifth aspect, the invention is a method for making a prelaminate, including: (a) applying an adhesive to a structured surface of a tool to form an adhesive layer with a structured surface and a non-structured surface; (b) laminating a backing to the non-structured surface of the adhesive layer to form a prelaminate; and (c) removing the prelaminate from the tool.

In a sixth aspect, the invention is a method for making a laminate, including: (a) providing a first prelaminate comprising a first adhesive layer with a structured first major surface and a non-structured second major surface, and a cap layer contacting the first major surface of the first prelaminate; and (b) providing a second prelaminate including a second adhesive layer with a structured first major surface and a non-structured second major surface, and a backing contacting the second major surface of the second prelaminate; and (c) contacting the second major surface of the first prelaminate to the first major surface of the second prelaminate.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 12A shows a method for fabricating the multi-layer construction depicted in FIG. 6A.

FIG. 12B shows a method for fabricating the multi-layer construction depicted in FIG. 7.

FIG. 12C shows a method for fabricating the multi-layer construction depicted in FIG. 6B.

Like reference symbols in the various drawings indicate like elements.

DETAILED DESCRIPTION

Figure 1A:
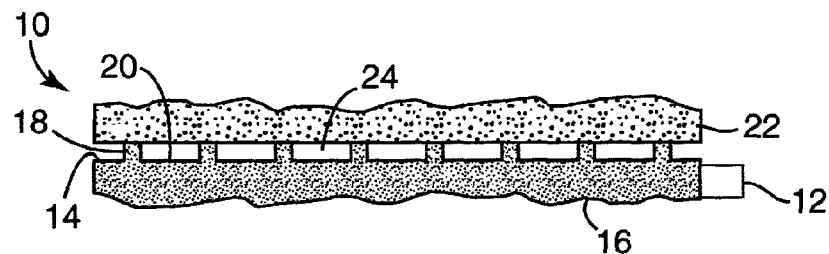
FIGS. 1A and 1B are cross-sectional views of embodiments of a laminate article in accordance with the invention.

Referring to FIG. 1A, in one aspect the invention is a laminate article 10 including a layer 12 having a first major surface 14 and a second major surface 16. The first major surface 14 includes a pattern of structures 18 and corresponding land areas 20. The regular arrays of structures described in U.S. Pat. No. 6,197,397 B1 (Sher et al.), U.S. Pat. No. 5,897, 930 (Calhoun et al.) and U.S. Pat. Nos. 5,650,215 and 6,123, 890 (Mazurek et al.), incorporated herein by reference, are preferred. A cap layer 22 placed in contact with the structured surface 14 of the layer 12 forms an array of at least partially encapsulated channels or reservoirs or channels 24. The size, shape, distribution and contents of the channels and reservoirs or channels 24 may be selected to tailor the properties of the laminate article 10. The materials selected for the layer 12 and the cap layer 22 may vary widely depending on the intended application. For example, in the embodiment illustrated in FIG. 1A, the layer 12 is a structured polymeric film, and the cap layer 22 is a non-structured adhesive layer.

Figure 1B:
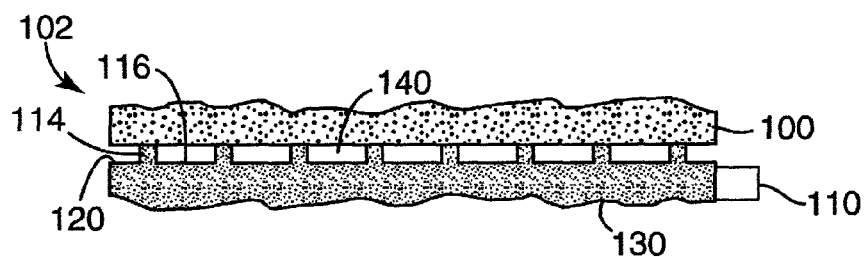

Referring to FIG. 1B, a preferred embodiment the invention is a laminate article 102 including an adhesive layer 110 with at least one structured major surface 120. The surface 120 includes a plurality of structures 114 and an arrangement of corresponding land areas 116. The structures 114 and/or the land areas 116 on at least a portion of the structured surface 120 are in contact with a cap layer 100. The regions of the structured surface 120 overlain by the cap layer 100 include an array of fully or partially encapsulated reservoirs or channels 140. The adhesive layer 110 further includes a second major surface 130, which may be structured or non-structured. Surfaces referred to herein as non-structured do not possess a structured topography.

Any adhesive is suitable for the adhesive layers of the present invention. Useful adhesives for the purposes of the present invention include those capable of retaining a structured surface after being embossed with and removed from a structured molding tool. Non-limiting examples of suitable adhesives include pressure sensitive adhesives, epoxies, structural adhesives, bonding adhesives, emulsion adhesives, and hot melt adhesives.

Pressure sensitive adhesives, including any type of pressure sensitive adhesive described in Satas, et al., *Handbook of Pressure Sensitive Adhesives,* 2d ed. 1989, are preferred. Classes of pressure sensitive adhesives include, for example, acrylics, natural and synthetic rubbers, ethylene vinyl acetate, poly(alpha-olefins), vinyl ethers, and silicones. The adhesives may be in the form of copolymers, bicontinuous adhesives, hydrogels, latex emulsions, macromers, and block copolymers. Suitable block copolymers are commercially available from Shell Oil Company (Houston, Tex.) under the trade designation KRATON.

More preferred pressure sensitive adhesives include, for example, acrylics, poly(olefins), KRATON, and silicones, and acrylics are particularly preferred. Suitable acrylic adhesives are disclosed, for example, in U.S. Pat. Nos. 3,239,478, 3,935,338, 5,169,727, U.S. Pat. No. RE 24,906, U.S. Pat. Nos. 4,952,650, 4,181,752, 5,986,011, 5,637,646 and 5,753, 768. A suitable class of acrylate pressure sensitive adhesives is the reaction product of at least one alkyl acrylate with at least one reinforcing comonomer. Suitable alkyl acrylates are those having a homopolymer glass transition temperature below about −10° C. and include, for example, n-butyl acrylate, 2-ethylhexylacrylate, isoctylacrylate, isononyl acrylate, ethylene monoacrylate, octadecyl acrylate and the like. Suitable reinforcing monomers include, for example, acrylic acid, itaconic acid, isobornyl acrylate, N,N-dimethylacrylamide, N-vinyl caprolactam, N-vinyl pyrrolidone, and the like.

The pressure sensitive adhesives can be prepared and coated using a variety of standard methods. For example, the pressure sensitive adhesives can be polymers that are dispersed in solvent or water and coated onto a liner or molding tool. If a solvent borne or water borne pressure sensitive adhesive composition is employed, then the adhesive layer may undergo a drying step to remove all or a majority of the carrier liquid. The adhesive may be cured using an energy source (e.g., heat, UV radiation, e− beam, and the like). Alternatively, adhesives may be applied without dispersal in a solvent or water using a variety of methods, such as, for example, melting or extruding the adhesive onto a liner or molding tool. The adhesive can be cross-linked with an energy source such as heat, UV radiation, e−beam radiation, and the like. In yet another alternative, monomeric pre-adhesive compositions can be coated onto a liner or molding tool and polymerized and cross-linked with an energy source, as described above.

The surface of the liner or molding tool may have applied thereon regions of different adhesives, such as for example, alternating strips of two different adhesive formulations, or may include multiple layers, each with different adhesive formulations.

The thickness of the adhesive layer 110 may vary widely depending on the intended application, and typically ranges from about 2 μm to about 800 μm, preferably from about 20 μm to about 150 μm.

The adhesive can optionally include one or more additives such as, for example, initiators, fillers, plasticizers, cross-linkers, tackifiers, chain transfer agents, fibrous reinforcing agents, woven and non-woven fabrics, foaming agents, antioxidants, stabilizers, fire retardants, viscosity enhancing agents, coloring agents, and mixtures thereof.

Referring again to FIG. 1, at least one major surface 120 of the adhesive layer 110 in the article 102 includes a structured topography. The structured topography includes structures 114 with specific shapes that form a plurality of discrete reservoirs or channels 140 when overlain by the cap layer 100. Preferably, the structures form a substantially regular array or pattern in the adhesive layer and include, for example, rectilinear patterns, polar patterns, geometric patterns, and cross-hatch patterns. The array or pattern of structures may optionally reside on both major, opposing surfaces 120, 130 of the adhesive layer 110 (not shown in FIG. 1). The shape, size and distribution of the structures 114 in the adhesive layer 110 may be precisely controlled to provide an array of reservoirs or channels 140 with a particular size, while maintaining a known contact area between the cap layer 100 and the adhesive layer 110.

The reservoirs or channels 140 of the structured adhesive layer 110 may be at least partially filled with deliverable and/or non-deliverable substances. A deliverable substance is contained within the reservoirs or channels 140 and can diffuse out of the reservoirs or channels 140 and adhesive layers 110 when the article 102 is in use. Non-deliverable substances remain essentially contained within the reservoirs or channels 140 and adhesive layers 110 of the article 102 during use. Reservoirs or channels 140 can include one or more types of deliverable and/or non-deliverable substances. Optionally, the adhesive layer 110 can include deliverable or non-deliverable substances, which may be the same or different from the substances present in the reservoirs or channels.

The deliverable and non-deliverable substances can be in a variety of forms, such as, for example, gases (including air), solids, liquids, gels, pastes, foams, powders, agglomerated particles, microencapsulated liquids, suspensions, and the like. Deliverable and non-deliverable substances include, for example, hormones, antimicrobials, antifungal agents, lotions, ointments, indicators (e.g., bacterial, pressure, color, pH, and temperature indicators), proteins, inks, dyes, vibration dampening fluids, and drugs (e.g., pain killers and antibiotics).

The reservoirs or channels 140 are at least partially covered by a cap layer 100 (described below) that encapsulates deliverable and non-deliverable substances within the void volume of the reservoirs or channels. This plurality of discrete, encapsulated reservoirs compartmentalizes the encapsulated substances and minimizes communication between the contents of neighboring reservoirs within the same or different adhesive layers. In contrast, channels are substantially continuous voids that provide unrestricted or less restricted movement of the deliverable and non-deliverable substances within the adhesive layer.

Referring to FIG. 1, in embodiments of the invention where the reservoirs or channels 140 contain air and the article 102 has a non-structured exposed surface 130 that can be adhered to a target substrate, the adhesive coated articles exhibit increased peel strength as compared to non-structured adhesive coated articles of the same thickness. Articles of the invention exhibit peel strengths of at least 21-42 oz/0.5 inch for a thickness of about 3.0 to about 7.0 mils using the Peel Adhesion Test Procedure described below. In comparison, standard non-structured adhesives of the same thickness exhibited peel strengths of between about 20-25 oz/0.5 inch. Although peel strength is typically proportional to the amount of adhesive material, these samples require less material to achieve comparable peel strengths relative to non-structured articles of the same thickness.

The shapes of the structures 114 in the adhesive layer 110 may be varied to achieve specific requirements for a given application. The size, shape and distribution of the structures 114 depend on, for example, the total volume of deliverable and/or non-deliverable substances to be contained in the reservoirs or channels 140, the rate of delivery of the substances, and the peel adhesion of the adhesive layer 110 required for a particular application. The height and width of the structures 114, which may extend above and/or below the plane of the adhesive layer, may be selected to achieve the desired performance. Suitable discrete shapes for the structures 114 include hemispheres, right pyramids, trigonal pyramids, prisms (such as square prisms, rectangular prisms, cylindrical prisms and other similar polygonal features), square pyramids, quadrangle pyramids, circles, ellipsoids and polygons (e.g., hexagons and diamonds). Suitable substantially continuous and interconnecting shapes for the structures include grooves (e.g., "V" grooves) and ridges (e.g., "Y" shaped ridges). The final dimensions of the structures may vary widely depending on the rheology of the adhesive layer and the application conditions. Although the structures within the adhesive are designed to be of substantially regular shape, irregularities may arise because the adhesive may partially creep over time.

Combinations of the different structure shapes, sizes, and orientations can be utilized in different regions of the adhesive layer 110, or a particular region of the adhesive layer 110 may include patterns with multiple or overlapping structures.

Figure 2:
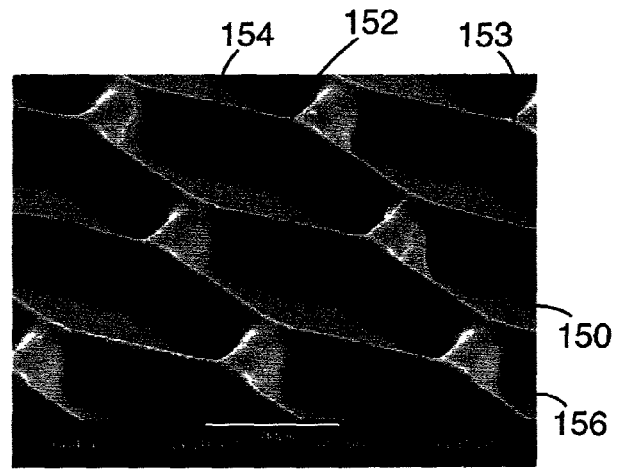
FIG. 2 is a scanning electron micrograph of a close-packed hexagonal structured adhesive.

To provide a substantially large reservoir void volume for a particular area of an adhesive layer, preferred structures include hexagons and diamonds. One suitable structure for this purpose is shown in FIG. 2, which includes hexagonal structures 150, each forming a reservoir 152 in the adhesive layer 153. Each reservoir 152 is enclosed by six sidewalls or posts 154, which protrude above the surface of the adhesive layer 156.

Figure 3:
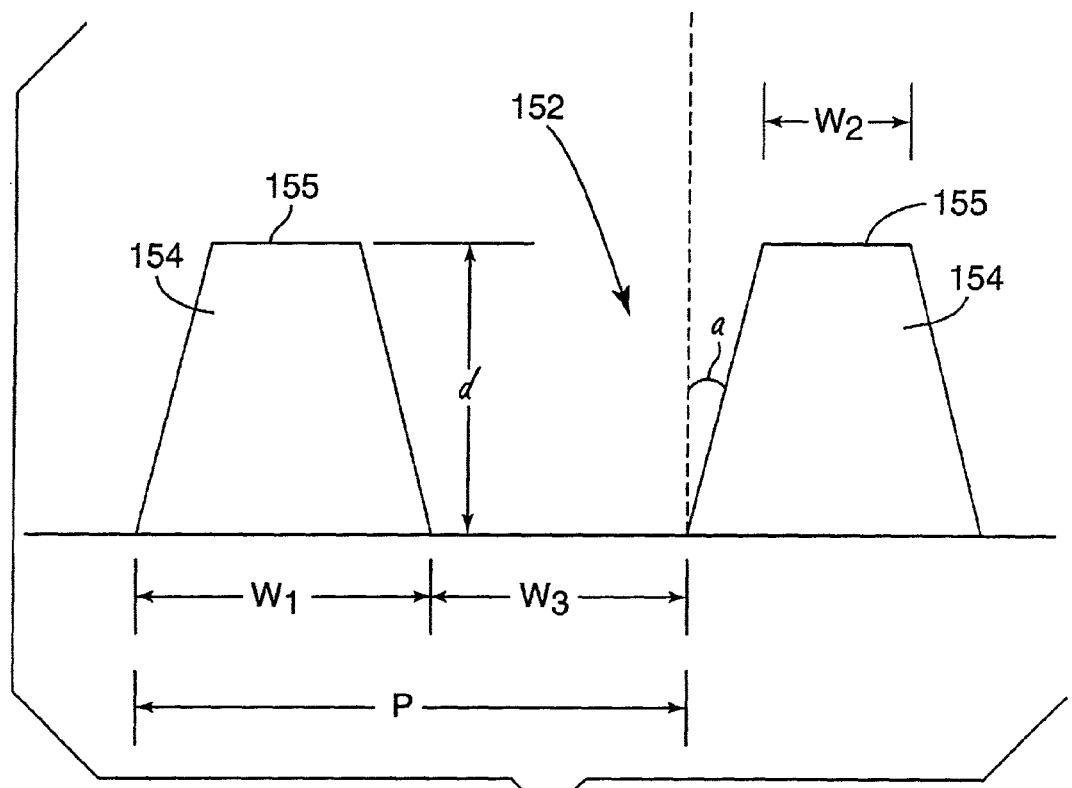
FIG. 3 is a schematic cross-sectional view of a portion of the structured adhesive of FIG. 2.
Figure 4:
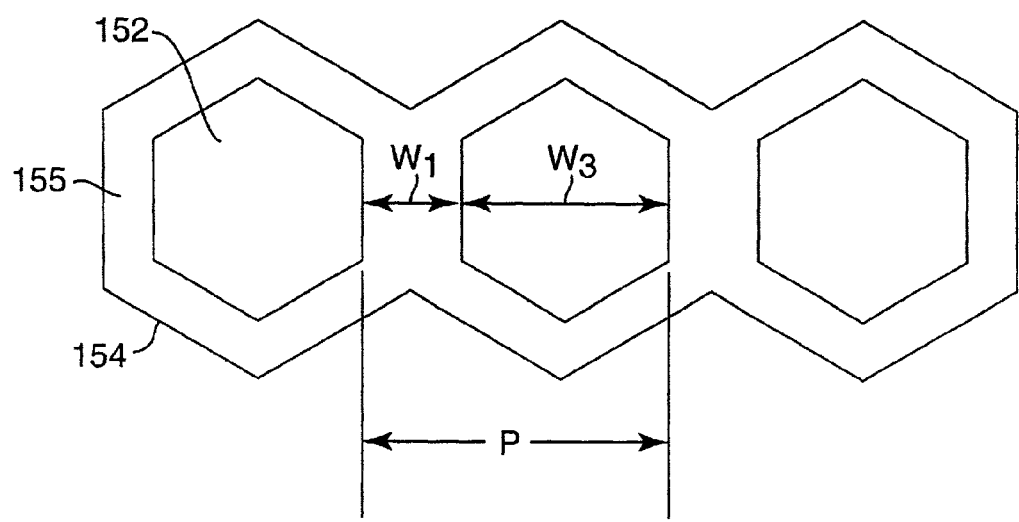
FIG. 4 is a schematic overhead view of a portion of the structured adhesive of FIG. 2.

FIG. 3 shows two substantially parallel sidewalls 154 of a hexagonal structure 150 of FIG. 2. Referring to FIG. 3, the sidewalls 154 each make an angle α with respect to a plane normal to the surface 156 of the adhesive layer 153. The angle α may be selected from an angle greater or equal to 0° and less than 90°, measured with respect to the plane of the surface of adhesive layer 156. The angle α is preferably greater than about 0° and less than about 45°, more preferably greater than about 2° and less than about 20°. The depth of each reservoir or channel 152, measured from a plane of the adhesive layer 156 to the top 155 of the sidewall 154 is preferably less than 2 mm; more preferably about 10 μm to about 200 μm; most preferably about 70 μm to about 150 μm. The width of the sidewall 154 at its base $W_1$ is preferably between about 5 μm and about 5 mm, more preferably between about 20 μm and about 80 μm. The distance $W_2$ across the top 155 of the sidewall 154 is preferably less than 2 mm, more preferably about 0.05 μm to about 60 μm. The distance $W_3$ between the bases of the sidewalls 154 is preferably less than about 30 mm, more preferably less than about 5 mm, most preferably about 50 μm to about 250 μm, as measured between any two parallel sidewalls 154 of the reservoir or channel 152 (see also FIG. 4). The sum of $W_1$ and $W_3$ defines the repeat unit of the pattern and is referred to herein as the pitch.

In the case of discrete reservoirs 152, each discrete reservoir has a void volume of less than about 100 μl; preferably less than 20 nL; more preferably less than 4 nL. The number of reservoirs 152 per unit area of the adhesive layer 156 is generally between about 5 E+06/cm² to 1/cm²; preferably about 1.20E+03 to about 1.00E+06/cm². Preferably, the pattern of structures defines a discrete void volume of above 20 nL to about 80 μL; more preferably between about 20 nL to about 20,000 nL on any 1 cm² area of the adhesive layer 156.

Discontinuous reservoirs or channels generally have a void volume between 0.1 and 99.9% of the total volume of the adhesive layer, preferably 0.5 to 50%, and more preferably 1 to 20%.

Referring again to FIG. 1, the cap layer 100, which is preferably a substantially continuous layer, can be, for example, a structured or non-structured backing, a structured or non-structured adhesive layer, a membrane, or the like. The contact area between the structures 114 on the first major surface 120 and the cap layer 100 may vary widely depending on the intended application, and is between about 0.5% and about 99%; preferably between about 5% to about 80%; and more preferably between about 20% to about 40%. For example, for a close-packed hexagonal structure (FIG. 2), $$\text{the theoretical percent contact area equals} = \left[1 - \frac{(p-w)^2}{p^2}\right] * 100,$$

where p=pitch and w=width of wall at point of contact (also referred to above as $W_2$).

In one preferred embodiment of the invention, the cap layer 100 is a backing. As used herein, the term backing refers to a thin sheet, which, after being placed in intimate contact with the adhesive, cannot be subsequently removed without damaging adhesive coating. The backing protects the adhesive and any components contained in the adhesive layer and/or reservoirs or channels from the environment. The backing can be a stiff, flexible, occlusive, non-occlusive or breathable film as desired. Further, as the backing is in contact with the adhesive and the components contained in the adhesive and/or reservoirs or channels, it is important that the backing be stable and substantially non-reactive to such components in order that the backing retains its structural integrity. It is also important that the backing not absorb the components from the adhesive or the reservoirs or channels. It may also be desirable for the backing to be heat sealable at a relatively low temperature to a variety of other polymeric substrates.

The backing preferably has sufficient structural integrity such that the backing is capable of being coated and handled. Backings can be made of any material conventionally utilized as a tape backing or may be made of other flexible or stiff material. Typical examples of flexible tape backing materials include those made of paper, plastic films such as polypropylene, polyethylene, particularly low density polyethylene, linear low density polyethylene, metallocene polyethylenes, high density polyethylene, polypropylene, polyvinyl chloride, polyester (e.g., polyethylene terephthalate), randomly oriented nylon fibers, ethylene-vinyl acetate copolymer, polyurethane, vinyl, polyvinylidene fluoride, cellulose acetate and ethyl cellulose, and polyamide films such as those commercially available from E. I. DuPont de Nemours & Co. (Wilmington, Del.) under the trade designation KAPTON.

Backings also can be prepared of fabric such as woven fabric formed of threads of synthetic or natural materials such as cotton, nylon, rayon, glass, polyester, ceramic material, and the like, or nonwoven fabric such as air laid webs of natural or synthetic fibers or blends of these. The backing may also be formed of metal, metalized polymeric films, glass, wood, or ceramic sheet materials. Backings that are layered such as polyethylene terephthalate-aluminum-polyethylene composites are also suitable.

Suitable backings include poly(ethylene terephthalate) film, non-woven polyester, cloth, silk, rayon, and foam. Backing materials can be pretreated (i.e., primed). Common pretreatments include corona treatment and chemical priming.

Figure 5A:
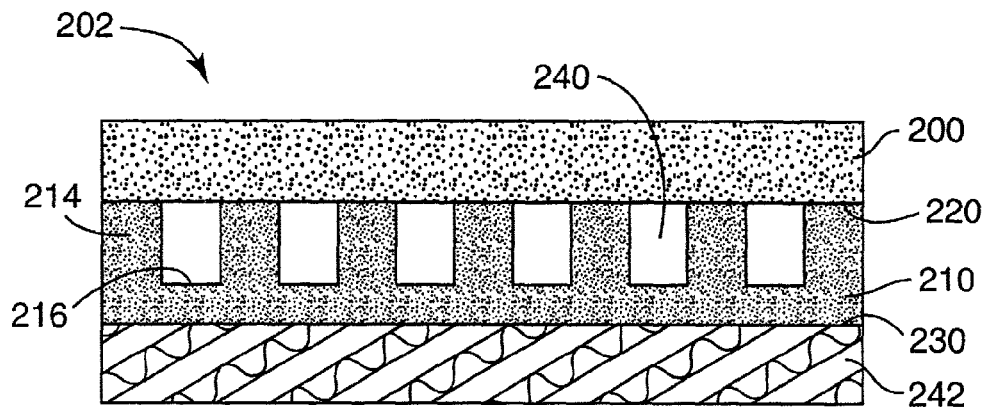
FIG. 5A is a cross-sectional view of a laminate article with a cap layer and backing.

Referring to FIG. 5A, an adhesive coated article 202 is shown where the cap layer 200 is an non-structured adhesive layer. The construction includes at least one adhesive layer 210 having at least one structured major surface 220. The first major surface 220 of the adhesive layer 210 includes structures 214 and land areas 216. The regions between the structures 214 in contact with the cap layer 200 creates a plurality of reservoirs or channels 240. The construction 202 further includes a backing 242, which protects the non-structured second major surface 230 of the adhesive layer 210.

Figure 5B:
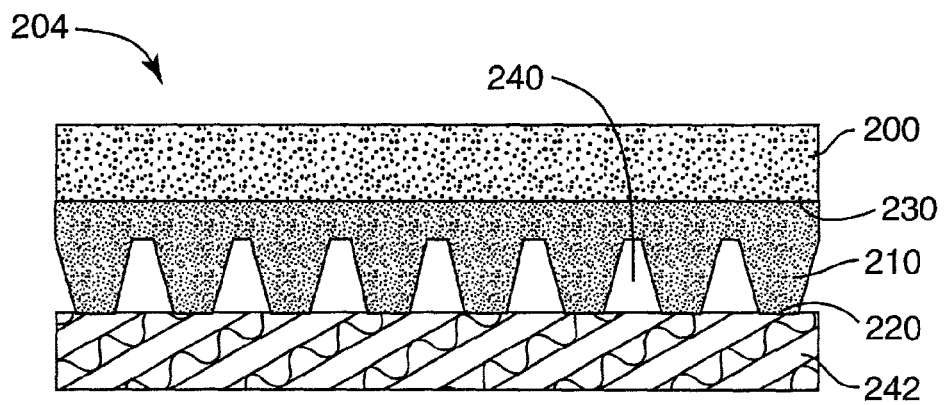
FIG. 5B is a cross-sectional view of an embodiment of a laminate article.

Alternatively, as shown in the construction 204 in FIG. 5B, the first major surface 220 of adhesive layer 210 is in contact with the backing 242, and the second major surface 230 is in contact with the cap layer 200 (as shown in FIG. 5B).

Figure 5C:
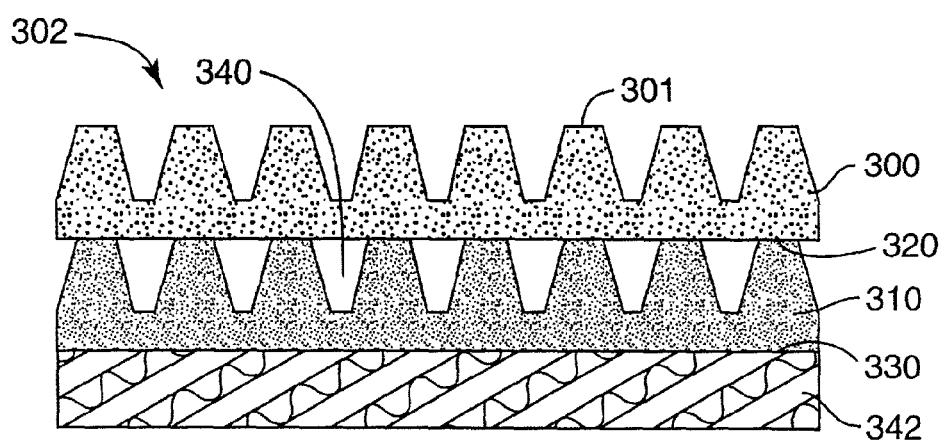
FIG. 5C is cross-sectional view of an embodiment of a laminate article with two structured adhesive layers.

In another embodiment, the cap layer can be a structured adhesive layer. FIG. 5C shows an adhesive article 302 that includes an adhesive layer 310, having at least one structured major surface 320. Adhesive layer 310 is in contact with a structured adhesive cap layer 300, having at least one structured major surface 301. Adhesive layers 300 and 310 can have the same or different compositions and structures. The article 302 shown in FIG. 5C includes a plurality of encapsulated reservoirs or channels 340 between the adhesive layer 310 and the cap layer 300.

Figure 5D:
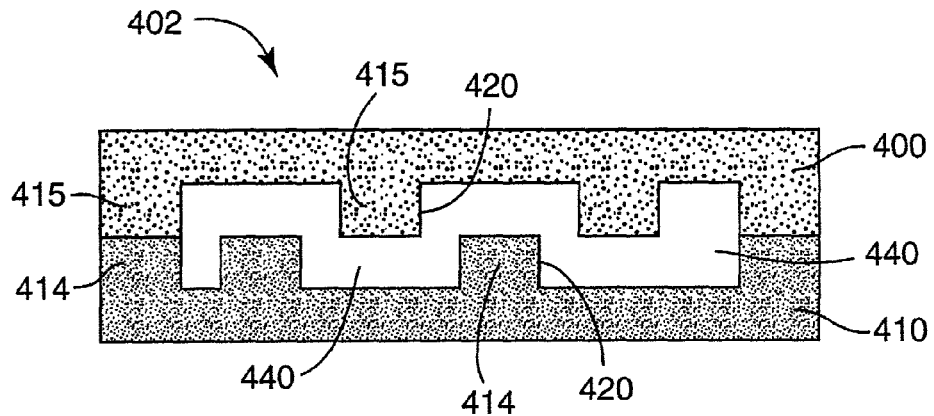
FIG. 5D is a cross-sectional view of an embodiment of a laminate article with two structured adhesive layers.

FIG. 5D shows another embodiment where the cap layer can be a structured adhesive layer. The adhesive coated article 402 includes an adhesive layer 410, having at least one structured major surface 420 with structures 414. The adhesive layer 410 is in contact with a structured adhesive cap layer 400, having at least one structured major surface 420 including structures 415. The structured major surfaces of the adhesive layers 410 and 400 are adjacent and are preferably aligned so as not to be registered with each other in order to create an enlarged, interconnected void volume 440. The alignment of the adhesive layers shown in FIG. 5D, for example, forms a substantially continuous reservoir 440 within the adhesive coated article. The array of reservoirs or channels on the created by the aligned structured layers 400 and 410 may include dead end regions, leading to more than one reservoir. All or a portion of the structures 414, 415 may contact each other to allow for a continuous reservoir in order to minimize sagging between the unsupported regions of the reservoirs or channels 440.

In another aspect, the invention is a multi-layer article including two or more adhesive layers, each having at least one structured surface. The adhesives and structures of the two or more adhesive layers can include the same adhesives and structures or different adhesives and structures. The multi-layer constructions include a plurality of encapsulated reservoirs or channels having dimensions similar to those described above.

Figure 6A:
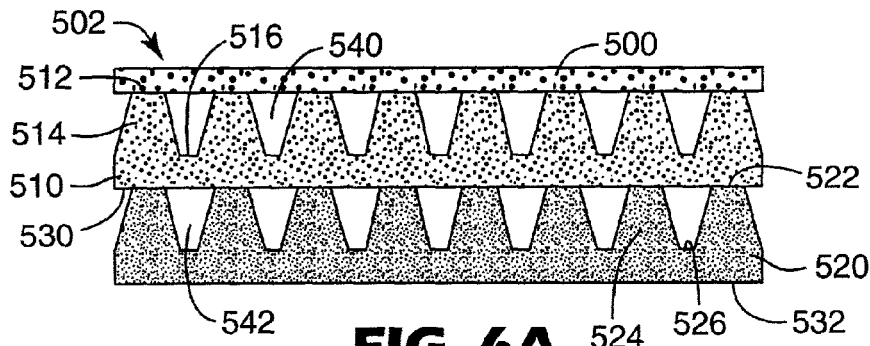
FIG. 6A is a cross-sectional view of an embodiment of a laminate article with two structured adhesive layers.

Referring to FIG. 6A, the article 502 includes a first and second adhesive layer 510 and 520, respectively, each having at least one structured major surface. The first adhesive layer 510 has a structured first major surface 512 with structures 514 and land areas 516, and a second non-structured major surface 530. The second adhesive layer 520 has a structured first major surface 522 in contact with the surface 530 of the first adhesive layer 510, and includes structures 524 and land areas 526, as well as a second non-structured major surface 532. The surface 532 may optionally be a structured surface. A cap layer 500 overlies the first major surface 512 of the first adhesive layer 510. In the embodiment shown in FIG. 6A, the structured surface 512 of the layer 510 is in contact with the cap layer 500. Optionally, one or more additional structured and/or non-structured adhesive and/or non-adhesive layers can be interposed between the cap layer 500 and the first adhesive layer 510. The structures 514, 524 can be vertically registered, as shown in FIG. 6A, or can be out of register with each other. In the construction depicted in FIG. 6A, lamination of the two structured adhesive layers 510, 520 creates two layers of encapsulated reservoirs or channels 540, 542 within the article 502. Each encapsulated reservoir has a void volume of less than about 1 µl; more preferably between about 0.0001 nl and about 5 nl.

Figure 6B:
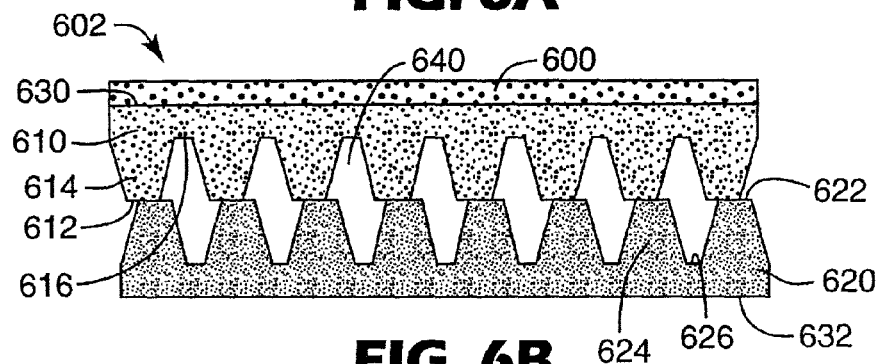
FIG. 6B is a cross-sectional view of an embodiment of a laminate article with two structured adhesive layers.

In another aspect, the invention is a multi-layer adhesive coated article including two or more adhesive layers, each having at least one structured surface, with the structured surfaces facing each other. The adhesives and structures of the two or more adhesive layers can include the same adhesives and structures or different adhesives and structures. Referring to FIG. 6B, an article 602 includes a first and second adhesive layer 610 and 620, respectively, each having at least one structured major surface. The first adhesive layer 610 has a structured first major surface 612 with structures 614 and land areas 616, as well as a non-structured second major surface 630. A cap layer 600 is in contact with the second major surface 630. Optionally, the second major surface 630 of the first adhesive layer 610 also can be a structured surface. The second adhesive layer 620 has a structured first major surface 622 with structures 624 and land areas 626, as well as a non-structured second major surface 632. Optionally, the second major surface 632 of the second adhesive layer 620 can also be a structured surface. In the embodiment depicted in FIG. 6B, the adhesive layers 610, 620 are generally not aligned so that the structured first major surface 612 of the first adhesive layer 610 is only partially in contact with the structured first major surface 622 of the second adhesive layer 620. Lamination of adhesive layers 610 and 620 in this manner creates a plurality of encapsulated reservoirs or channels 640 within the adhesive coated article. Each reservoir has a void volume that is essentially the sum of the void volume of the reservoirs or channels within the two layers, typically less than about 1 µl, preferably less than 200 nl; more preferably between about 0.0002 nl and about 40 nl.

Figure 7:
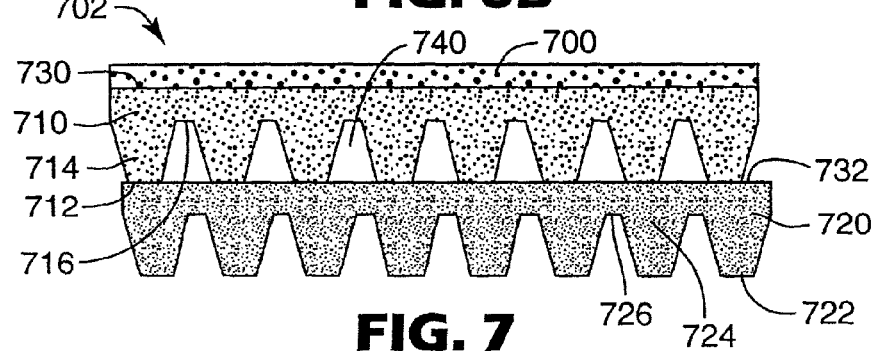
FIG. 7 is a cross-sectional view of an embodiment of a laminate article with two structured adhesive layers.

In another embodiment, the invention is a multi-layer adhesive coated article including two or more adhesive layers, each having at least one structured surface. One of the structured adhesive surfaces is an exposed surface suitable for contact with a target substrate. Referring to FIG. 7, a multi-layer article 702 is shown having a first adhesive layer 710 with at least one structured surface. The adhesive layer 710 has a structured first major surface 712 with structures 714 and corresponding land areas 716, as well as a non-structured second major surface 730. The second major surface 730 is in contact with a cap layer 700. Alternatively, the second major surface 730 is a structured surface, and/or the first major surface 712 can be in contact with the cap layer 700. The adhesive coated article also includes a second adhesive layer 720 with at least one exposed, structured major surface 722 having structures 724 and land areas 726. The adhesive layer 720 further includes a second major surface 732 that can be a structured or a non-structured surface (as shown in FIG. 7). Lamination of adhesive layers 710 and 820 in the manner shown in FIG. 7 forms a plurality of encapsulated reservoirs or channels 740 within the adhesive coated article with dimensions similar to those described above. Upon contact with a target substrate, single and multi-layer adhesive coated articles having exposed structured surfaces (FIG. 7) exhibit lower peel strengths compared to standard non-structured adhesive articles of the same thickness. These constructions are particularly suitable for making thin, highly conformable, low peel strength tapes.

In the constructions illustrated in FIGS. 6A, 6B, and 7, one or more additional structured and/or non-structured adhesive and/or non-adhesive layers can be interposed between the cap layer and the first adhesive layer of the multi-layer constructions or between any two layers of the multi-layer constructions. Additionally, one or more additional structured and/or non-structured adhesive and/or non-adhesive layers can be laminated to the second major surface of the second adhesive layer in the constructions depicted in FIGS. 6A, 6B, and 7. Each additional layer can be structured on one or both sides and can include one or more types of structures and adhesive and non-adhesive materials.

The laminate articles of the present invention can further include an optional release liner (not shown), which protects the adhesive layers and contents included within the adhesive matrix and/or reservoirs or channels from damage and contamination. The liner should be capable of being placed in intimate contact with an adhesive surface and may be subsequently removed without damaging the adhesive layer. Suitable liners include conventional release liners comprising a known sheet material such as coated polyester, polyester web, polyethylene web, polystyrene web, or polymer-coated paper. The liner is typically a polymer-coated paper with a silicone release coating or a fluoropolymer coating containing perfluorinated groups, a polyethylene coated polyethylene terepthalate (PET) film with silicone release coatings, or a cast polyolefin film with a silicone release coating. Non-limiting examples of liners include materials from Minnesota Mining & Manufacturing Company (3M) of St. Paul, Minn., Rexam Corporation of Iowa City, Iowa, Daubert Coated Products of Westchester, Ill., P.S Substrates, Inc., Schoeller Technical Papers, Inc., AssiDoman Inncoat GmbH, and P.W.A. Kunstoff GmbH.

The constructions of the present invention can be tailored to form encapsulated reservoirs or channels of specific sizes and shapes in specific location within the adhesive coated article. Encapsulated reservoirs or channels, in one or more of the structured layers can contain a controlled amount and distribution of air and/or one or more deliverable and/or non-deliverable substances. The adhesive coated articles can be used for a variety of applications, such as, for example, fluid and air transport, as delivery (e.g., drug delivery) devices, as vibration, sound, and energy dampening materials, as repositionable tapes, as indicator tapes, and as high-bonding and highly conformable thin-film tapes.

The structures in the adhesive layers may be made as described U.S. Pat. No. 6,197,397 B1 (Sher et al.) and U.S. Pat. No. 6,123,890 (Mazurek et al.), which are incorporated herein by reference. The topography may be created in the adhesive layer by any known technique, preferably by a contacting technique such as casting, coating, or compressing. The topography of the tool used to create the pattern may be made using any known technique, such as, for example, chemical etching, mechanical etching, laser ablation, photolithography, stereolithography, micromachining, knurling, cutting, or scoring.

Figure 8:
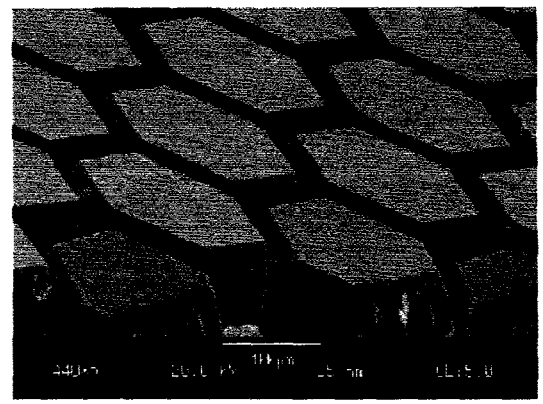
FIG. 8 is a scanning electron micrograph of a structured molding tool.

For example, the pattern of structures in the adhesive layer can be made by casting a layer of adhesive on a molding tool having a machined pattern. For example, FIG. 8 shows a scanning electron micrograph of the molding tool used to generate the structured topography in the adhesive layer of FIG. 2. The structured adhesive layer seen in FIG. 2 has a surface essentially replicating the inverse of the topography of the molding tool shown in FIG. 8.

Generally, the molding tool is pre-treated with a release coating prior to the embossing step. Once the tool is treated with the release coating, the adhesive can be extruded or solvent coated and dried onto the tool and laminated to a backing. The adhesive may be preheated to improve adhesion to the backing layer. In some applications, the adhesive is cured or cross-linked while on the tool to prevent premature cold flow. Alternatively, other adhesives are removed from the tool prior to curing. The exposed surface of the structured adhesive layer may be contacted with another adhesive layer to form a second laminate or multi-layer construction. These lamination steps can be repeated to generate a multi-layer construction of the desired thickness. The adhesive layer(s) can then be cured or cross-linked with an energy source, such as heat, UV radiation, e$^-$ beam radiation, and the like. Depending on the type of adhesive, the adhesive may be solidified or physically cross-linked upon cooling the laminate to room temperature. After curing, cross-linking, or solidifying the adhesive, the structures on the surface of the adhesive layer substantially retain their shape over time. The selection of the adhesive plays a role in determining the long-term properties of the structured adhesive layer(s). The process can be scaled up as a continuous process utilizing the methods described in U.S. Pat. No. 6,123,890.

Additional membrane layers, transfer liners, release liners, adhesive layers (structured and non-structured), polymer films (structured and non-structured), and the like, can be laminated to the adhesive construction using lamination techniques that are well known to those skilled in the art.

Lamination of the cap layer to the structured surface of the adhesive and/or lamination of multiple structured layers creates a plurality of encapsulated reservoirs or channels within the adhesive coated article. The amount of void volume contained in the encapsulated reservoirs or channels can be tailored based on the adhesive composition and size and shape of the tooling used to generate the structures of each layer.

FIGS. 9-11 show two general methods for fabricating articles with encapsulated reservoirs or channels and non-structured surfaces for adhering to a substrate. FIG. 9 illustrates a method for making an adhesive layer for use in the constructions shown in FIGS. 10 and 11.

Figure 9A:
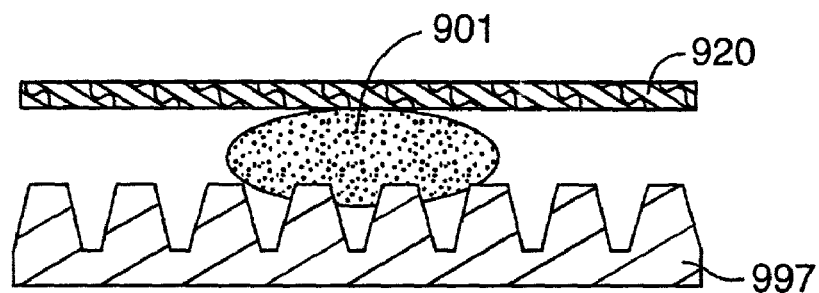
FIGS. 9A-9C illustrate a method for making a structured adhesive layer.
Figure 9B:
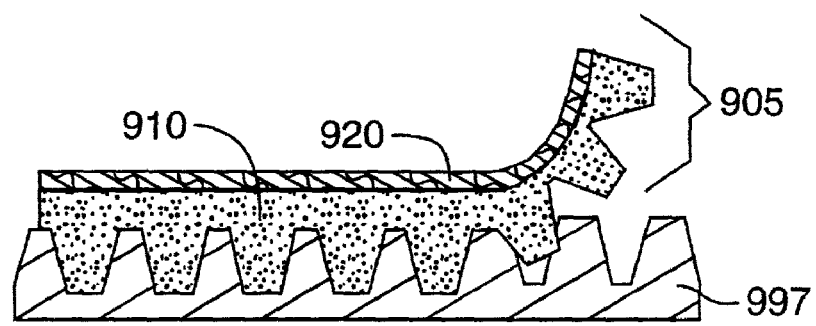
Figure 9C:
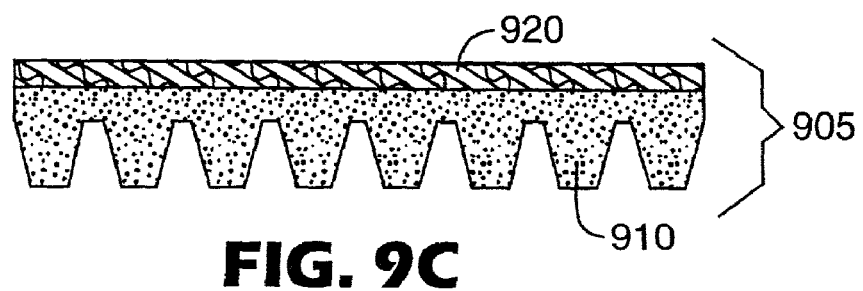

Referring to FIGS. 9A-9C, a structured adhesive layer 910 may be prepared by melting or extruding or solvent-coating an adhesive 901 onto a structured molding tool 997 and then laminating the structured adhesive 910 to a backing 920. Typically, a solventless adhesive 901 is pressed between the molding tool 997 and the backing 920 (e.g., a non-structured liner) under pressure at an elevated temperature such that the adhesive 901 flows. The press is cooled while maintaining pressure, and, as shown in FIG. 9B, the laminate 905 is subsequently removed from the molding tool 997 and cured or cross-linked using UV irradiation to generate the laminate 905 (FIG. 9C).

Figure 10A:
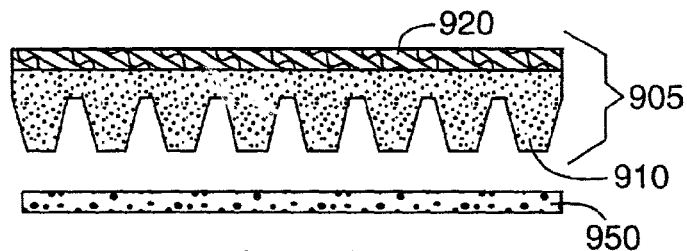
FIGS. 10A-10B show a method for making a laminate article.
Figure 10B:
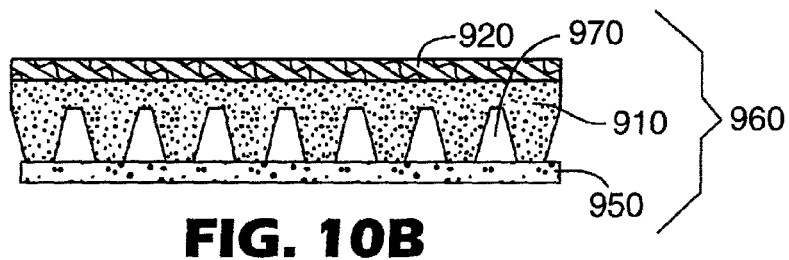

Referring to FIGS. 10A-10B, the laminate 905 can be further laminated to a cap layer 950 or to a non-structured adhesive layer to form an article 960 (FIG. 10B), which forms a plurality of encapsulated reservoirs or channels 970. If the cap layer 950 is a single structured adhesive layer, this method can be used to form the constructions illustrated in FIGS. 6 and 7.

Figure 11A:
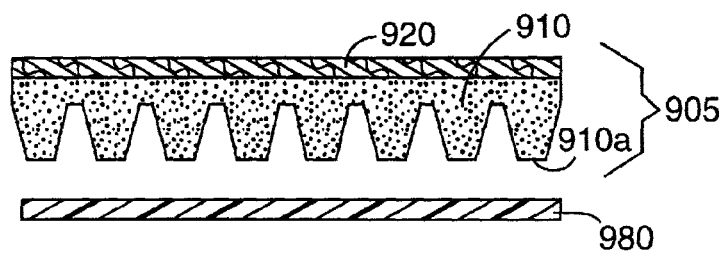
FIGS. 11A-11C show a method for making a laminate article.
Figure 11B:
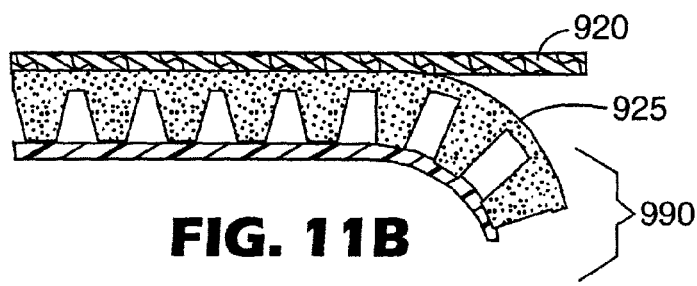
Figure 11C:
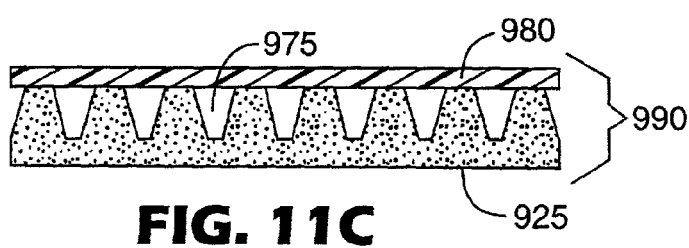

Referring to FIGS. 11A-11C, a method is shown that provides a laminate 905 including a backing 920 having a structured adhesive layer 910 thereon. The exposed adhesive surface 910A is laminated to a cap layer 980, such as, for example, a primed polyester backing. The resulting laminate 990 is then removed from the original backing 920 (FIG. 11B), exposing a non-structured adhesive surface 925. The laminate 990 includes a non-structured adhesive surface 925 suitable for contact with a substrate, a structured surface in contact with a cap layer 980, and a plurality of encapsulated reservoirs or channels 975 (FIG. 11C). This basic construction can be further laminated to, for example, a single structured adhesive layer to form the construction illustrated in FIG. 6A.

Referring to FIG. 12A, a method is shown for fabricating the multi-layer construction depicted in FIG. 6A. The method includes laminating the laminate 990 (FIG. 11C) to a second laminate 905 (FIG. 10A), both made according to the methods described above. The resulting multi-layer adhesive coated article includes a plurality of reservoirs or channels 940 within the article construction. The reservoirs or channels may be registered with each other, as shown in FIG. 12A. However, other embodiments include adhesive layers in which the structured surfaces are not registered with each other. Each structured surface may have a different pattern of structures.

Referring to FIG. 12B, a method is shown for fabricating the multi-layer construction depicted in FIG. 7. The method involves first applying an adhesive 901 to a molding tool 997 as described above (FIG. 9A) generating a structured adhesive 910. An laminate 905 (FIG. 9C) is then laminated to a first major surface 912 of the structured adhesive 910. The multi-layer laminate 800 is subsequently removed from the molding tool 997 to generate the laminate 800 with reservoirs or channels 840. The method may further involve laminating a non-structured adhesive onto a structured adhesive surface 996 of the multi-layer laminate 800.

Referring to FIG. 12C, a method is shown for fabricating the multi-layer construction depicted in FIG. 6B. The method includes laminating together the exposed structured major surfaces 912A and 912B of two adhesive coated articles having the construction 905 (FIG. 9C), with included backings 920A and 920B. The resulting multi-layer adhesive coated article 850 includes a plurality of encapsulated reservoirs or channels 890 within the construction. The backing 920B is subsequently removed to reveal a non-structured, exposed surface 999 for adhering to a target substrate.

Additional membrane layers, transfer liners, release liners, adhesive layers (structured and non-structured), and the like, can be laminated to one or both sides of the adhesive constructions of the invention using lamination techniques that are well known to those skilled in the art.

Methods for filling the reservoirs in the constructions of the invention (such as construction 102 depicted in FIG. 1) include dipping, spraying, coating, sonicating, or powdering an intermediate laminate 905 (such as depicted in FIG. 9C) with liquid or solid. Subsequent lamination of laminate 905 to a cap layer encapsulates the material within the reservoirs of the construction. Fluid filling of constructions in which a cap layer 100 has already been applied to the structured surface, such as depicted in FIG. 1, can be accomplished by several means. Application of a pressure gradient can be used to load a fluid (such as a liquid containing a desired deliverable or non-deliverable substance) into the channels while displacing the air. This may be accomplished by simple mechanical means using, for example, a syringe/plunger. A particularly advantageous method of applying such a pressure gradient to fill the channels is by application of centrifugal force. If desired, venting may be supplied at the down stream (low pressure) ends of the channels such that air is displaced out of the channels as the fluid is introduced at the high pressure end. Conversely, centrifugal loading may be utilized in the absence of venting, such that the air is displaced countercurrent to the liquid being inserted. In this case the expelled air may be vented out through the same entry port via which the loading fluid is introduced.

Another means of filling channels with liquids in configurations including encapsulated reservoirs is through use of vacuum. Air may be evacuated from the channels until a sufficiently low pressure is reached, after which a liquid at a higher pressure (typically atmospheric) is brought into communication with the channels. Under this pressure differential, the liquid then fills the channels. This approach is especially suitable in cases in which venting is absent; that is, in which the only opening into the device is through the filling (liquid entry) port.

The reservoirs or channels of a construction, such as, for example construction 905, can be filled with deliverable and/or non-deliverable substances. Generally, the substance(s) is loaded into the exposed reservoirs or channels of the construction, followed by lamination of another structured or non-structured layer adhesive or non-adhesive layer. Upon lamination, the substance(s) are encapsulated within the reservoirs or channels of the construction. The adhesive composition may be formulated so that the deliverable and/or non-deliverable substance is retained within the reservoir. Specific regions within one or more of the adhesive layers can be filled with the same or different substances, depending on the application, the substances, the adhesive compositions, and/or the reservoir structure. Alternatively, in one layer, different materials can be stripe coated to provide different regions with different materials.

For liquids, substances can be introduced into the reservoirs or channels using a variety of methods, such as, for example, spraying, coating, and dipping. Alternatively, an ink-jet or other type of printer can be used to address specific locations and to load precise amounts of one or more deliverable and/or non-deliverable substances into the reservoirs or channels. One method of loading the reservoirs or channels includes dipping the adhesive coated article into the liquid, sonicating to displace the air bubbles in the fluid, and then drawing the adhesive coated article through, for example, a nip roller to remove excess liquid-filler. Generally, low-surface energy silicone coated film is used to cover the rollers. Excess fluid is removed from the surface using, for example, an implement, such as a squeegee or silicone-coated roller. One method that is particularly useful for loading channels includes sealing off the edges of the structured adhesive layer, punching a hole in the layer to form a filling port, applying a vacuum to the adhesive layer, filling the channels with fluid, and then closing the filling port.

For solid substances, the solid is first applied onto the surface of the adhesive and then the excess removed by, for example, shaking or drawing the adhesive through a nip roller. Optionally, the adhesive article may be cooled to minimize adhesion of the solid substance(s) to the sidewalls of the adhesive surface.

Gaseous substances, other than air, can be loaded into the reservoirs or channels by conducting the lamination process in a dry box filled with the gas or gas mixture of choice.

Test Methods

Wet Out

The wet-out was determined from the wall width of contact, which was measured using light microscopy (Model #301-371.011 microscope from Leica, Germany), and the known pitch. Samples were pressed onto a piece of glass, and the wall width was measured (using the microscope's scale bar). This method was utilized to gain an estimate of the contact area when the wall is under pressure.

Peel Adhesion

Peel adhesion is the force required to remove a coated flexible sheet material from a test panel measured at a specific angle and rate of removal. Following equilibration of samples at 50% relative humidity and 23.3° C., both immediate and aged (24 hours dwell) peel adhesion measurements were taken following the application of the sample to a glass test surface. The procedure followed was:

1. A 12.7 mm [0.5 inch] or 25.4 mm [1 inch] wide sample of the coated sheet was applied to the horizontal surface of a clean glass plate with at least 10.0 lineal cm in firm contact. A 2 kg hard rubber roller was used to apply the strip.
2. The free end of the coated strip was doubled back nearly touching itself so the angle of removal was 180° degrees. The free end was attached to the adhesion tester scale.
3. The glass test plate was clamped in the jaws of a tensile testing machine that was capable of moving the plate away from the scale at a constant rate of 0.3 meters [12 inches] per minute.
4. The scale reading was recorded as the tape was peeled from the glass surface and expressed in ounces per half inch (oz/0.5 in) or oz/in, depending on the width of the sample tested.

Shear

Samples were placed onto the edge of an aluminum plate so that only one inch of material is in contact with the plate, and the remaining was hanging off. A weight (200 g) was placed onto the end of the tape sample one inch from the edge of the aluminum plate. The time it took for the sample to shear from the aluminum plate was recorded.

WYKO

Adhesive samples were evaluated using interferometry microscopy using a WYKO RST surface profiler (WYKO Corp., Tucson, Ariz.). This technique used light interferometry to evaluate the surface roughness of a sample. Light was reflected from horizontal surfaces, and thus the depth of a microstructure could be determined by evaluating features at both the upper and lower edges of structured materials.

SEM

Scanning Electron Microscopy (SEM) was utilized to observe samples under high magnification and to obtain depth information. SEM analysis was conducted using a Model #1920-D SEM from Amray Incorporated (Bedford, Mass.).

Thickness

Thickness measurements were done with a micrometer in contact mode. The total thickness of the structured adhesive included the thickness of the microstructure as well as the thickness of the land (i.e, the continuous layer of that of adhesive that connected the structured features). The ratio of the adhesive thickness between the structure thickness and the land thickness was an important parameter to consider. In the following examples, the thickness of the structured region remained constant, yet the land thickness varied. The land thickness was determined by subtracting the depth (thickness) of the structured region from the total thickness of the adhesive.

Thickness also was measured using WYKO, as described above. Since WYKO is a non-contact measurement method, compression of the structured surface can be avoided.

Adhesive Compositions

A thermoplastic pressure sensitive adhesive consisting of 90 parts by weight isooctyl acrylate and 10 parts by weight acrylic acid with 0.5% ionic cross-linker was prepared as described in U.S. Pat. Nos. 5,986,011, 5,637,646, and 5,753,768.

EXAMPLES

Example 1

WYKO Analysis for Construction 905

Figure 13:
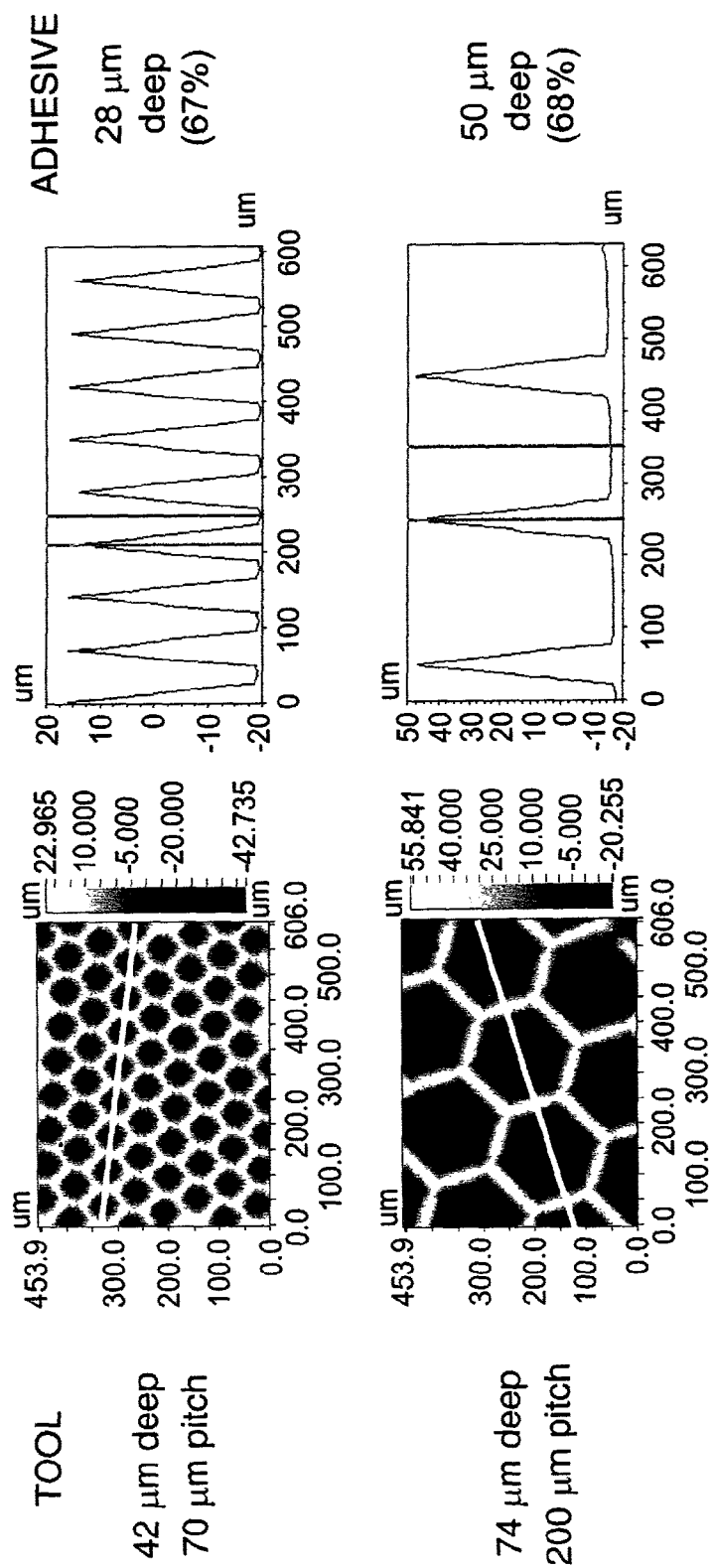
FIG. 13 shows WYKO analysis for 3 structured molding tools and 3 structured adhesives.

Two samples were prepared having the general construction 905 depicted in FIG. 9C. Adhesive was applied to three different molding tools and then laminated to a poly(ethylene terephthalate) backing in accordance with the invention. A non-structured adhesive layer of the same thickness was prepared as a control sample. Two samples having different structures were characterized using WYKO to monitor the surface roughness and fidelity of the adhesive structures over time. WYKO analysis indicated that the adhesive had a structured surface with features of regular height and pitch as shown in FIG. 13. The height of the structures remained consistent at about 67% of tool depth throughout multiple runs.

Example 2

Wet-Out Analysis for Construction 905 Using WYKO

The degree of wet-out was monitored using light microscopy for two different structured adhesives with the depth and pitch dimensions of Example 1. A non-structured adhesive layer of the same thickness was prepared as a control sample. In this example, the structured adhesive was laminated with a 2 kg roller onto glass prior to analysis. Due to the small pitch, structures with a pitch of 70 μm had a higher percentage of wet-out than structures with approximately the same wall width with a pitch of 200 μm (Table 1). The structured pattern of these adhesive layers did not wet-out even after 6 months.

TABLE 1

| Tool (microns) depth × pitch | Wet-out Percentage | Shear time 200 g | Peel force (PSA of 5 mils) oz/0.5 in |
|---|---|---|---|
| 70 × 70 | 55-65% | 1 day | 13 |
| 100 × 200 | 25-35% | 6 hours | 5 |
| Non-structured | 95-100 | >21 days | 23 |

Example 3

Peel and Shear Characteristics for Construction 905

Figure 15:
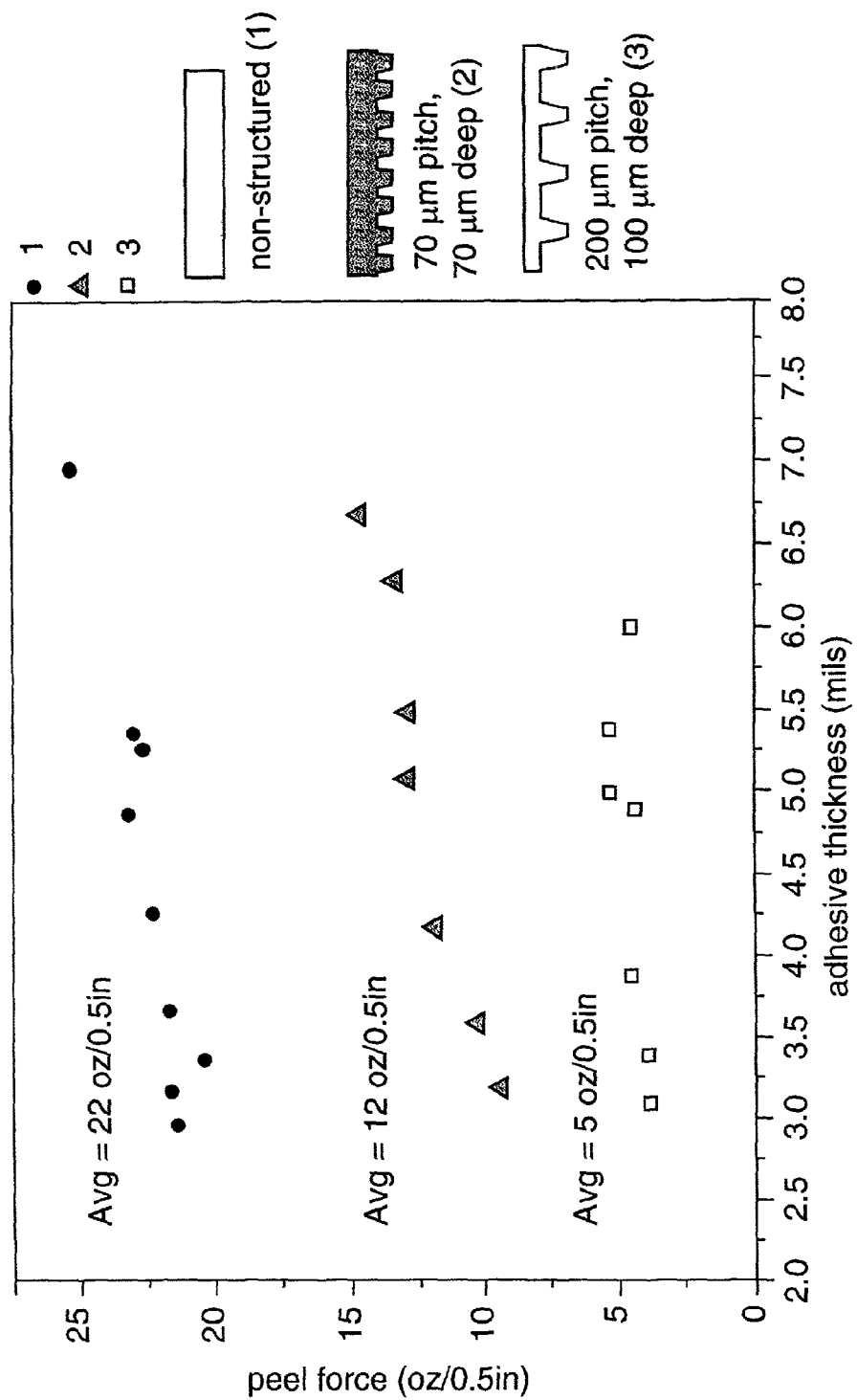
FIG. 15 shows a plot of peel force vs. thickness for non-structured and structured pressure sensitive adhesive tape.

Peel force data was collected for the three samples of Example 2 using the Peel Adhesion Test and appears in Table 1 and FIG. 15. The force to peel the structured adhesive samples was lower than the force required for the non-structured control sample. Table 1 also includes shear characteristics for each of the four samples. Structures with small pitch exhibited higher shear resistance than adhesive structures with larger pitch.

Figure 14:
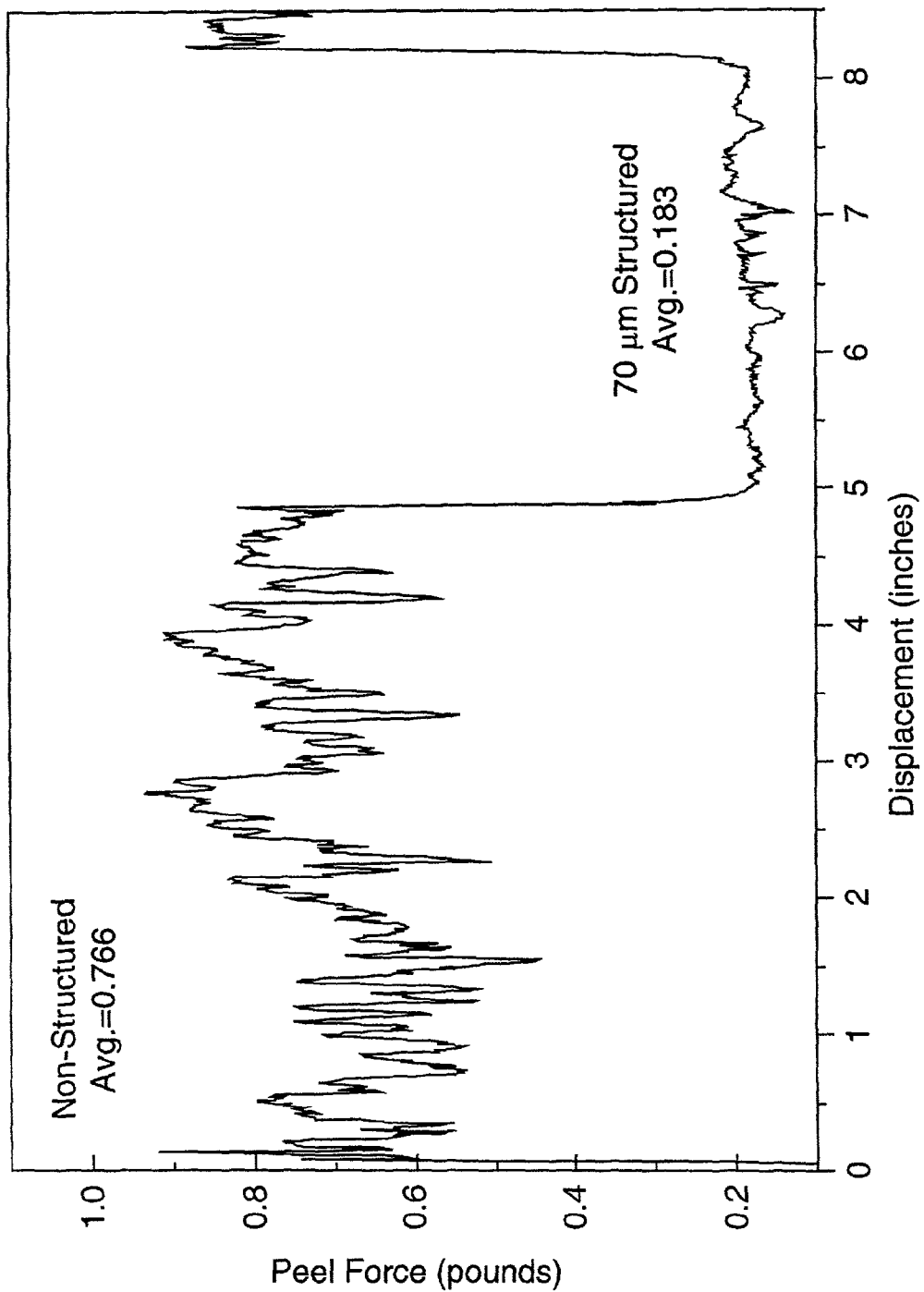
FIG. 14 shows a plot of peel vs. displacement for non-structured and structured pressure sensitive adhesive tape.

The peel from the structured adhesive was smoother than from the non-structured adhesive sample. FIG. 14 shows a plot of peel force versus displacement for a structured adhesive tape having a 70 μm pitch pulled at 90° at 5 inches per minute from aluminum. As can be seen in FIG. 14, the peel from the structured adhesive is smoother and more consistent than from the non-structured adhesive. The average peel force of the structured sample was less than the average force required to peel non-structured tape of the same thickness.

FIG. 15 shows a plot of peel force versus adhesive thickness for the three constructions described above. The structure with the largest pitch (i.e., lowest adhesive contact area) had the lowest peel force. For adhesives having hexagonal patterns, as the pitch decreased, the wet-out and peel force increased. The two structured adhesives of this example had a lower peel force than the non-structured adhesive.

Example 4

Preparation of Construction 990

A sample was prepared having the general construction 990 depicted in FIG. 11C according to the methods described above. Adhesive was applied to the molding tool having structures with a pitch of 70 μm and a height of 70 μm and then laminated to a poly(ethylene terephthalate) backing. The adhesive layer was then transferred to a primed poly(ethylene terephthalate) backing according to the general method shown in FIG. 11. The sample was characterized using light microscopy and WYKO to monitor the structures over time. Microscopy and WYKO analysis indicated that the adhesive had highly ordered and well-defined reservoirs or channels within the adhesive matrix. Reservoirs or channels with a height greater than 10 microns were stable longer than 9 months under ambient conditions with no applied pressure. WYKO and SEM were used to verify that the non-structured adhesive layer covering the reservoirs or channels was flat and smooth. Analysis revealed that there were few surface features on the non-structured adhesive surface.

Example 5

Peel Characteristics for Construction 990

Figure 16:
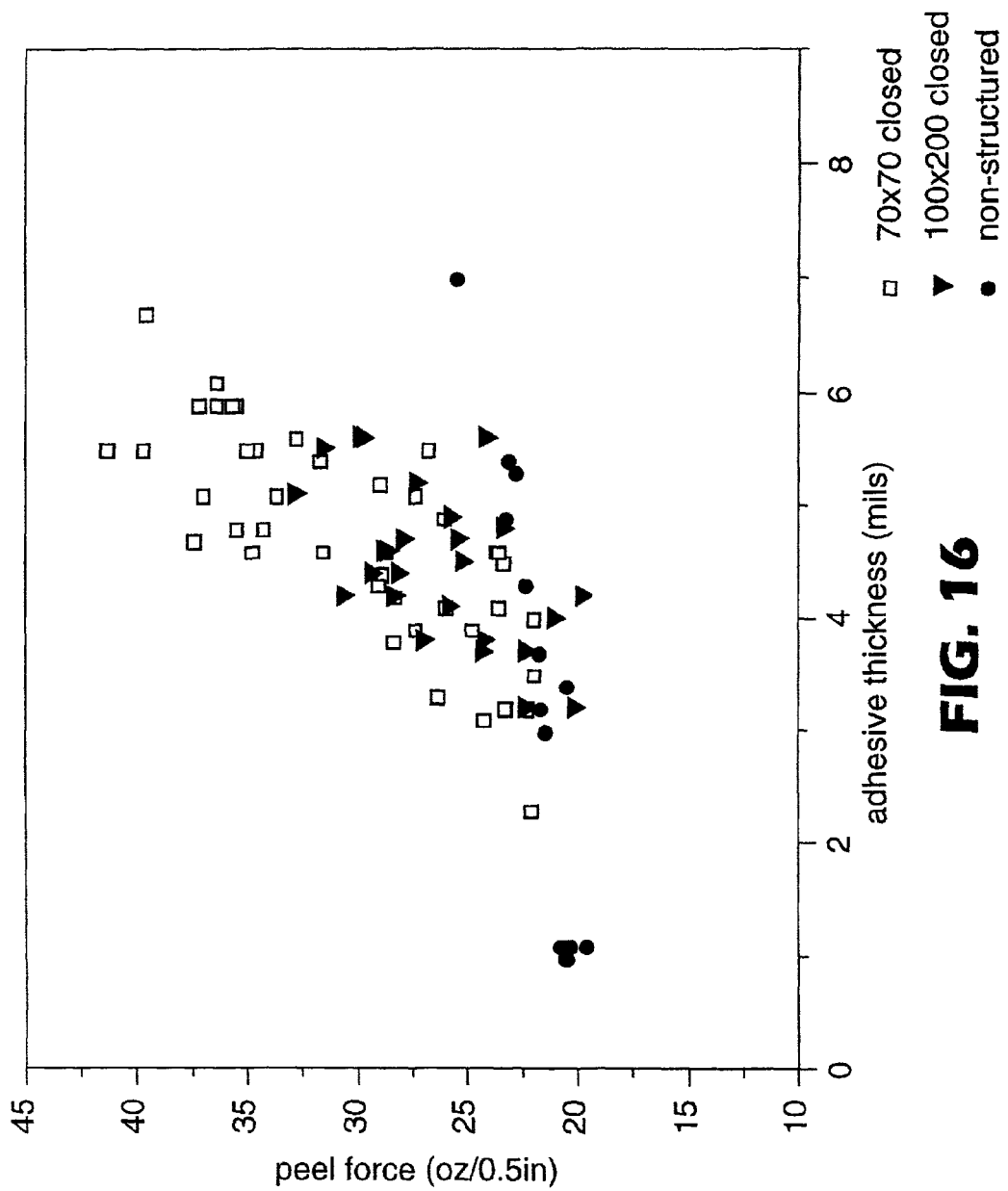
FIG. 16 shows a plot of peel force vs. adhesive thickness for non-structured and structured pressure sensitive adhesive tape.

Peel adhesion tests were performed for three constructions prepared as described in Example 4. The comparison of the peel forces for three designs is illustrated in FIG. 16. The tests indicated that the constructions including air filled reservoirs had a higher peel force than non-structured constructions of equal thickness, regardless of pitch or height. This is unlike non-structured adhesives, where more adhesive material is needed to increase peel force.

Example 6

Peel Characteristics for Multi-Layer Construction 502

Multi-layer samples were prepared having the general constructions 502 depicted in FIG. 6A using molding tools with several different pitch and depth dimensions. The multi-layer constructions were prepared according to the methods described above and depicted in FIG. 12A. Multi-layer constructions having a non-structured adhesive layer adjacent to surface 996 of construction 800 (depicted in FIG. 12B) were also tested. The two different constructions yielded similar results.

Figure 17:
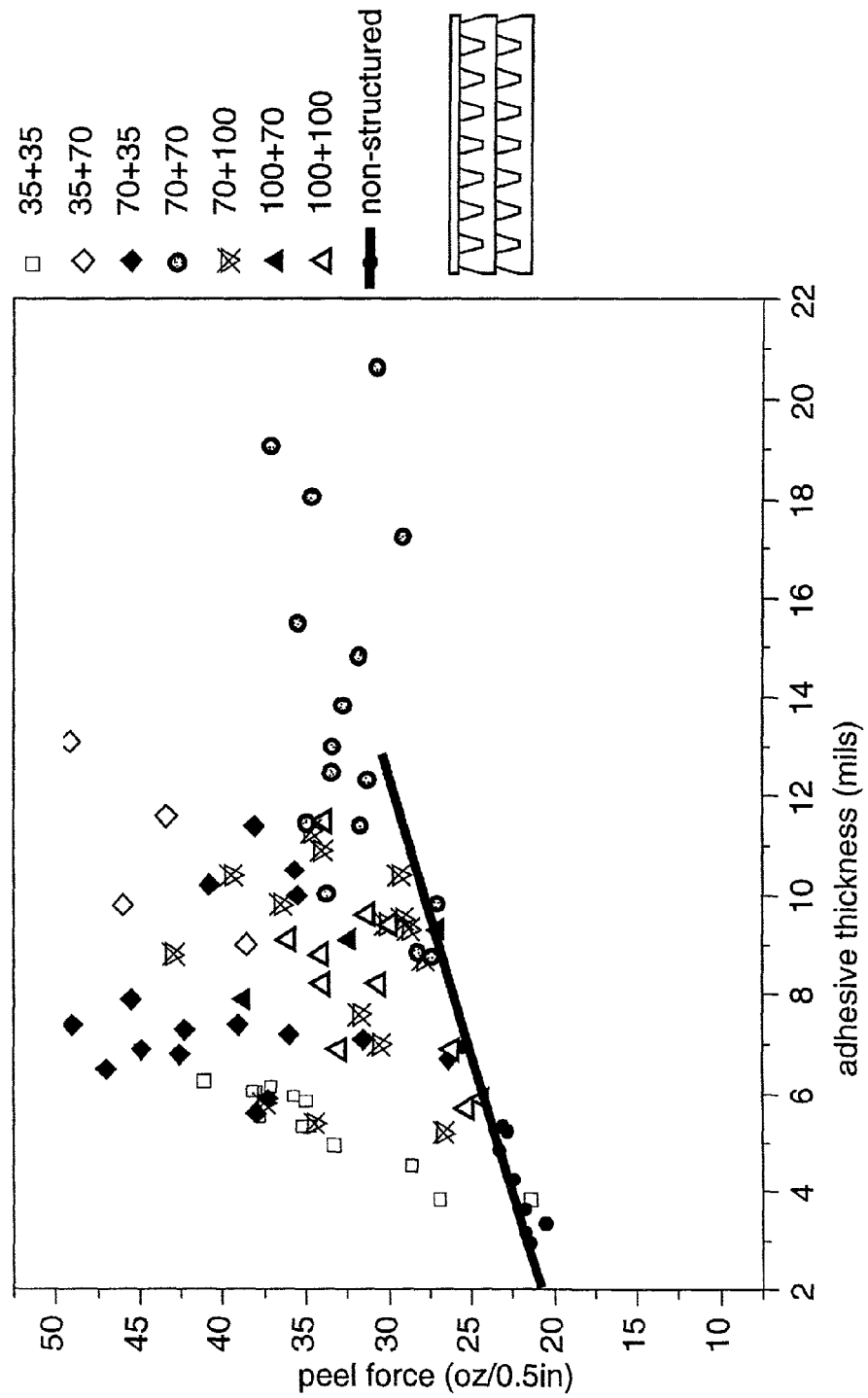
FIG. 17 shows a plot of peel force vs. adhesive thickness for non-structured and multi-layer structured pressure sensitive adhesive articles of FIG. 5A.

FIG. 17 shows a graph of peel force for the constructions with variable height and pitch. The legend indicates the height for the structures within each layer, starting at the layer adjacent to the backing. Although there was a wide scatter in the data, the plot indicated that the multi-layer adhesive coated articles exhibited a higher peel force relative to non-structured articles of the same thickness.

Example 7

Peel Characteristics for Multi-Layer Construction 602

Multi-layer samples were prepared having the general constructions 602 depicted in FIG. 6B. The multi-layer constructions were prepared according to the methods described above and depicted in FIGS. 12C with the cap layer 100 being a non-structured PET backing.

Figure 18:
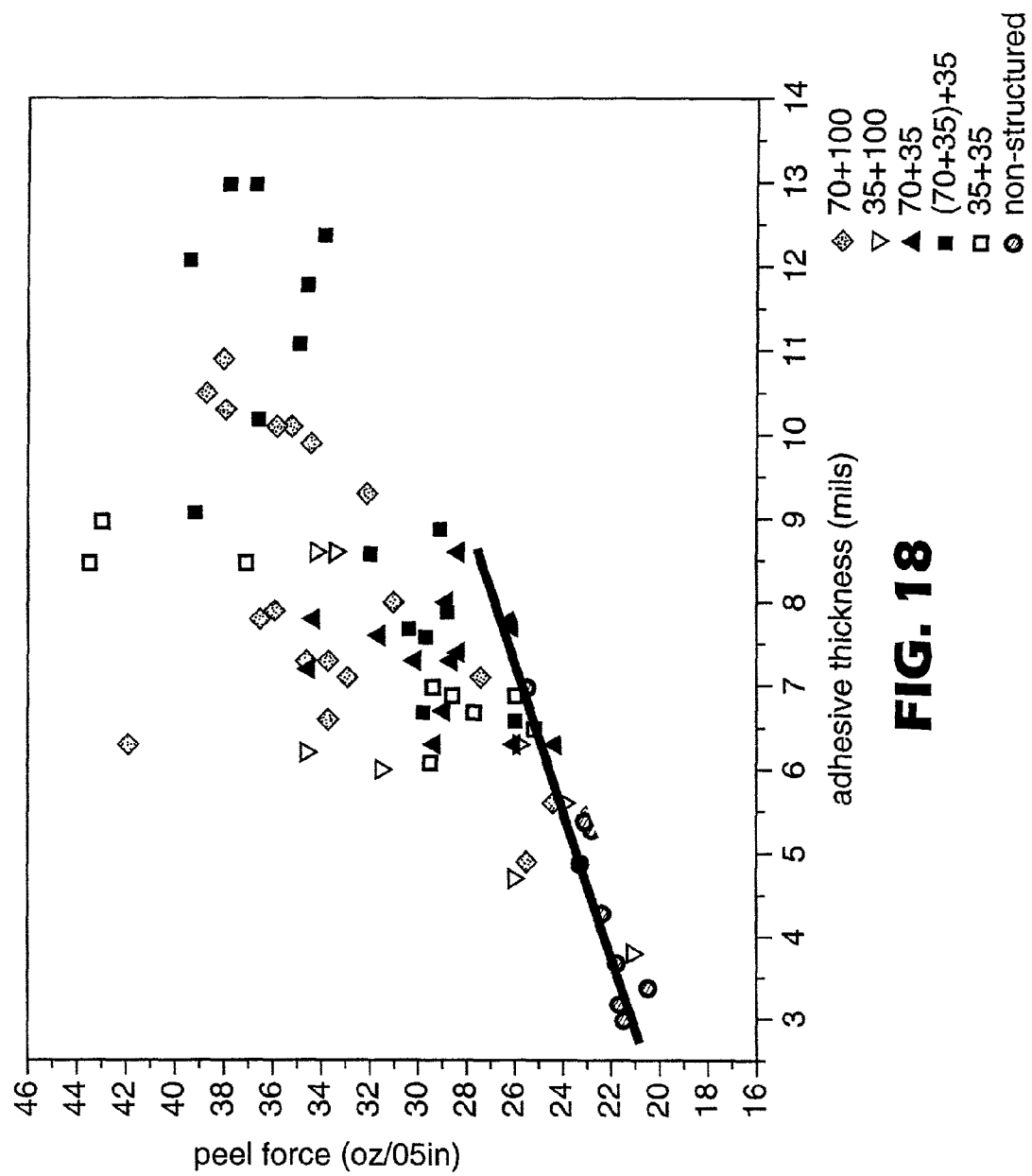
FIG. 18 shows a plot of peel force vs. adhesive thickness for non-structured and multi-layer structured pressure sensitive adhesive articles of FIG. 5D.

FIG. 18 shows a plot of peel force relative to adhesive thickness. The legend indicates that the height for the structures within each layer, starting at the layer (i.e., layer 1) adjacent to the backing. One of the constructions (referred to a (70+35)+35 in the figure legend) was prepared having the construction 602 with heights of 70 μm and 35 μm for layers 1 and 2, respectively. The construction included an additional structured adhesive opposite to the cap layer having structures with a height of 35 μm. The structured surface of this additional adhesive layer faced towards the cap layer. Although there was wide scatter, the plot indicated that the multi-layer constructions had a higher peel force relative to non-structured constructions of the same thickness.

Example 8

Peel Characteristics for Multi-Layer Constructions

Figure 19:
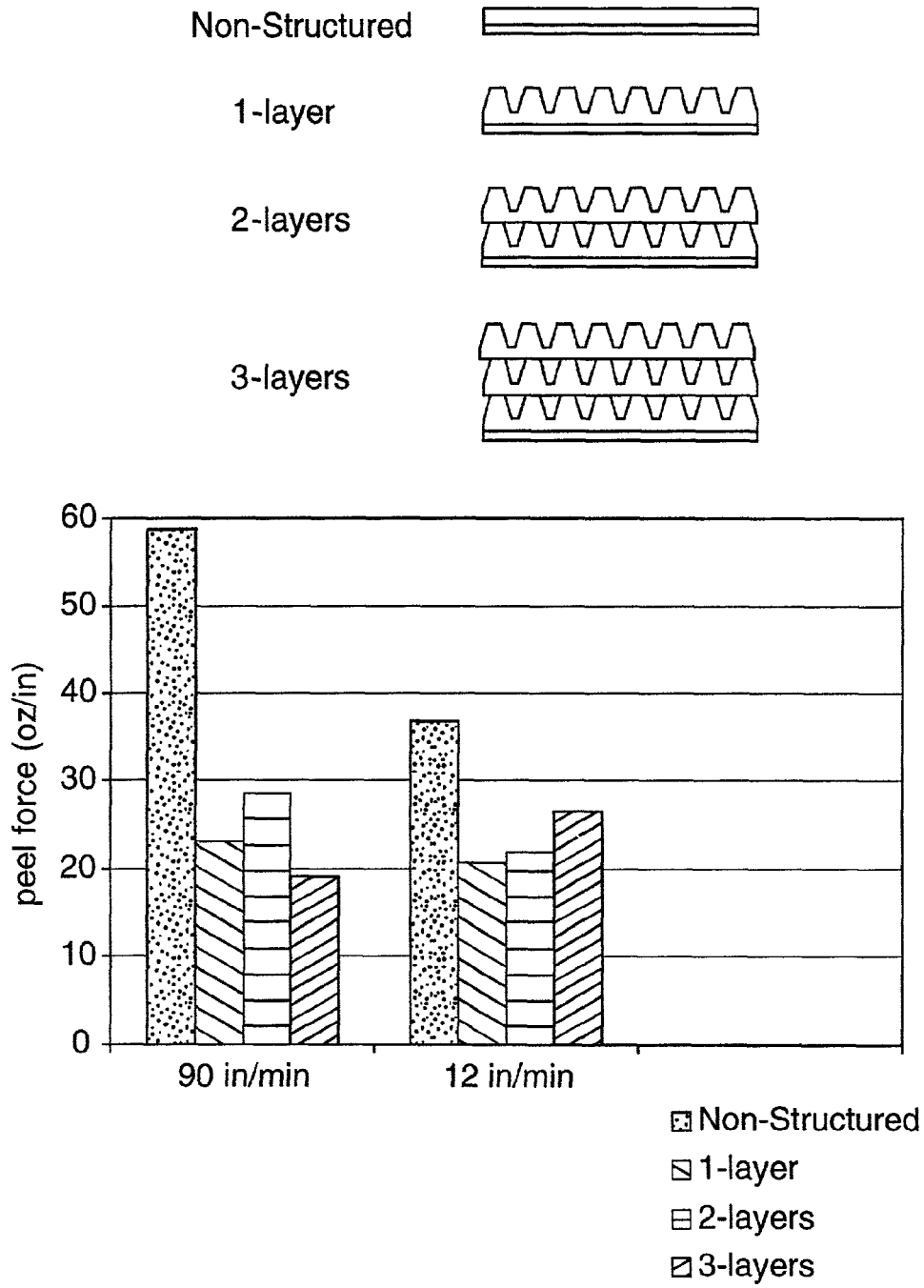
FIG. 19 shows a bar graph of peel force relative to rate and thickness for three structured adhesive coated articles.

Constructions having one, two, and three structured adhesive layers having the general constructions shown in FIG. 7 were prepared using the techniques in FIG. 12B. These samples were prepared to monitor the effect of increasing the number of adhesive layers on peel force. A construction having one non-structured adhesive layer served as a control sample. Referring to FIG. 19, a bar graph is shown illustrating the influence of peel rate on peel force for each of the four constructions. Peel forces were measured using the Peel Adhesion Test Procedure outlined above. The constructions were peeled from glass at 12 in/min and at 90 in/min, and peel forces were measured in ounces per inch.

At a peel rate of 90 in/min, the three adhesive constructions with structured surfaces exhibited a significantly lower peel force (<50%) than the construction having a non-structured exposed surface, regardless of the number of layers. The non-structured construction exhibited a substantial drop in peel force with lower peel rate (12 in/min). In contrast, the peel forces for each of the structured constructions remained more or less constant despite increasing the overall thickness of the constructions (i.e., by increasing the number of adhesive layers), and despite reducing the peel rate from 90 in/min to 12 in/min.

Example 9

Loading of Reservoirs or Channels with Solid Indicator

Phenophthalein powder was spread at room temperature over the exposed structured surface of an adhesive construction 905 (FIG. 9C) at room temperature.

A second structured adhesive layer was laminated to the exposed surface to cover the filled reservoirs to provide a construction 800 (FIG. 12B). The sample was then subjected to drops of 0.10M KOH. Generally, the phenophthalein did not turn to a magenta color as would be expected if the KOH had mixed with the powder. This indicated that the cross-linked adhesive layer provided a barrier that prevented migration of the KOH into the reservoirs or channels.

Example 10

Loading of Reservoirs or Channels with Colored Liquid

Liquid green food color was spread onto the surface of the structured adhesive layer of an adhesive coated article, prepared as described in Example 9, using the edge of a glass slide, and then the excess was removed using a silicone-coated roller. Once the sample was dry, it was laminated to another layer of structured adhesive to form a laminate similar to construction 800 depicted in FIG. 12B. Light microscopy images (not shown) indicated that the green food color remained encapsulated within the first layer of adhesive wells and did not migrate into the top adhesive layer.

Example 11

Construction of Device and Loading Channels with Fluid by Means of Vacuum

A low density polyethylene (LDPE) sheet was molded into a hexagon post pattern (as depicted in FIG. 8). The construction was prepared according to the method shown in FIGS. 9B and 9C, although no backing was required. The structured LDPE was cut into a one-inch diameter circle for evaluation. The LDPE disk was sandwiched between two non-structured adhesive tapes to form a construction similar to that illustrated in FIG. 1. The first tape consisted of a silicone pressure sensitive adhesive on BOPP film, and was adhered to the non-structured side of LDPE so that it protruded beyond the structured LDPE. This provided a non-structured sealing region around the perimeter of the structured area. The second tape was an acrylate pressure sensitive adhesive on silicone paper liner, and was adhered to the structured side of the LDPE, such that the adhesive layers came into contact around the perimeter of the disk, thus sealing the device around the edges. A similar construction could be achieved, without the necessity of the bottom adhesive/film layer, if a non-structured sealing area was provided (for example by molding) around the perimeter of the structured area of the LDPE. Alternatively, the microstructure on the perimeter of the LDPE could be collapsed by pressure during lamination, so as to form a sealed edge. A small hole was punched in the top acrylic/paper layer (prior to lamination) to allow access to the interior channels of the device. A vacuum pump was used to evacuate the air from the channels by means of a filling fixture, which seated against the fill hole of the device. A three-way valve was then operated which established a direct pathway between the fluid to be loaded (colored liquid) and the evacuated channels of the device. The liquid quickly flowed into the device and filled the channels. The amount of liquid was found to be 13 mg, thus establishing that this method can be used to load extremely small quantities of liquid into such devices.

A number of embodiments of the invention have been described. Nevertheless, it will be understood that various modifications may be made without departing from the spirit and scope of the invention. Other embodiments are within the scope of the following claims.

What is claimed is:

1. An article comprising at least one adhesive layer with a first major surface and a second major surface, wherein at least one of the first and second major surfaces is a structured surface;
and a backing directly adjacent to the structured surface(s) of the at least one adhesive layer, wherein both surfaces of the backing are non-structured;
wherein the article comprises discrete, encapsulated reservoirs between the structured surface of the at least one adhesive layer and the backing, each reservoir having a void volume of less than 20 nL, and
wherein the article has a non-structured exposed adhesive surface that can be adhered to a target substrate.

2. The article of claim 1, wherein the at least one adhesive layer comprises an adhesive selected from the group consisting of pressure sensitive adhesives, epoxy adhesives, structural adhesives, bonding adhesives, and combinations thereof.

3. The article of claim 2, wherein the pressure sensitive adhesive is selected from the group consisting of acrylics, natural and synthetic rubbers, ethylene vinyl acetate, vinyl ethers, silicones, poly(alpha-olefins), and combinations thereof.

4. The article of claim 1, wherein said article has a thickness of about 2 μm to about 500 μm.

5. The article of claim 1, further comprising an additional adhesive layer wherein the additional adhesive layer has either a structured adhesive surface or a non-structured adhesive surface.

6. The article of claim 1, further comprising at least one non-adhesive layer in contact with one of the first and second major surfaces.

7. The article of claim 1, wherein said reservoirs contain at least one deliverable or non-deliverable substance.

8. The article of claim 7, wherein the at least one deliverable or non-deliverable substance is selected from hormones, antibiotics, antimicrobials, antifungal agents, lotions, ointments, indicators, proteins, inks, dyes, drugs, and vibration-damping fluids.

9. The article of claim 7, wherein the at least one deliverable or non-deliverable substance is in the form selected from the group consisting of solids, liquids, gels, pastes, foams, powders, agglomerated particles, microencapsulated liquids, suspensions, and combinations thereof.

10. The article of claim 1, wherein the backing is a laminate.

11. The article of claim 5, wherein the second major surface of the at least one adhesive layer is a non-structured surface, the backing contacts the first major surface, and wherein the article further comprises a backing layer on the second major surface.

12. The article of claim 5, wherein the second major surface of the at least one adhesive layer is a structured surface, the backing contacts the first major surface, and wherein the article further comprises a backing layer on the second major surface.

13. The laminate article of claim 1 comprising:
a second adhesive layer having a first major surface and a second major surface, wherein
at least one of the first and second major surfaces is a structured surface,
wherein the at least one adhesive layer and the second adhesive layer are in contact.

14. The laminate article of claim 13, wherein the first major surface of the first adhesive layer is a structured surface and the second major surface of the first adhesive layer is a non-structured surface, and the first major surface of the second adhesive layer is a structured surface and the second major surface of the second adhesive layer is a non-structured surface, and the second major surface of the first adhesive layer contacts the first major surface of the second adhesive layer.

15. The laminate article of claim 13, further comprising a backing on the second major surface of the second adhesive layer.

16. The laminate article of claim 13, further comprising a cap layer on the first major surface of the first adhesive layer.

17. The laminate article of claim 13, wherein the first major surface of the first adhesive layer contacts the first major surface of the second adhesive layer.

18. The laminate article of claim 13, further comprising a backing layer on the second major surface of the first adhesive layer.

19. The laminate article of claim 13, wherein the first adhesive layer has a first pattern of structures on the first major surface thereof and the second adhesive layer has a second pattern of structures on the first major surface thereof, and wherein the first pattern is substantially aligned with the second pattern.

20. The laminate article of claim 19, wherein the first pattern is misaligned with the second pattern.

21. The article of claim 1, wherein the void volume is less than about 4 nL.

22. A tape comprising:
(a) at least one pressure sensitive adhesive layer comprising a first major surface and a second major surface, wherein the first major surface is a structured surface and the second major surface is a non-structured surface; and
(b) a non-adhesive flexible backing, non-structured on both surfaces, directly adjacent to the first major surface, p1 wherein the tape comprises discrete, encapsulated reservoirs between the structured surface of the adhesive layer and the backing, each reservoir having a void volume of less than 20 nL, and
wherein the tape has a peel strength of at least 21-42 oz/0.5 inch for a thickness of 0.003 to 0.007 inches.

23. The tape of claim 22, further comprising a backing adjacent the second major surface.

UNITED STATES PATENT AND TRADEMARK OFFICE
CERTIFICATE OF CORRECTION

PATENT NO. : 8,323,773 B2
APPLICATION NO. : 09/974710
DATED : December 4, 2012
INVENTOR(S) : Peggy-Jean Prest Flanigan et al.

It is certified that error appears in the above-identified patent and that said Letters Patent is hereby corrected as shown below:

On Title Page 2

Column 1
Line 13, Delete "15/231" and insert -- 156/231 --, therefor.

In the Specification

Column 4
Line 25, Delete "2d" and insert -- $2^{nd}$ --, therefor.
Line 45, Delete "isoctylacrylate," and insert -- isoocrylacrylate, --, therefor.

Column 7
Line 11, Delete "5 E" and insert -- 5E --, therefor.

Column 10
Line 41, Delete "terepthalate" and insert -- terephthalate --, therefor.
Line 48, Delete "Kunstoff" and insert -- Kunststoff --, therefor.

Column 14
Line 27, After "180°" delete "degrees".

Column 17
Line 65, Delete "Phenophthalein" and insert -- Phenolphthalein --, therefor.

Column 18
Line 4, Delete "phenophthalein" and insert -- phenolphthalein --, therefor.

Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,323,773 B2

In the Claims

Column 20
Line 46, In Claim 22, after "surface," delete "p1".